(12) United States Patent
Singer

(10) Patent No.: US 10,094,692 B2
(45) Date of Patent: Oct. 9, 2018

(54) SINGLE SERVE DISPENSER FOR A POWDERED NUTRIENT

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 15/664,600

(22) Filed: Jul. 31, 2017

(65) Prior Publication Data
US 2017/0328757 A1    Nov. 16, 2017

Related U.S. Application Data

(63) Continuation of application No. 15/009,632, filed on Jan. 28, 2016, now Pat. No. 9,752,912.

(51) Int. Cl.
| | |
|---|---|
| *G01F 11/18* | (2006.01) |
| *B65B 1/08* | (2006.01) |
| *B65B 1/36* | (2006.01) |
| *B65B 39/00* | (2006.01) |
| *G01F 15/18* | (2006.01) |
| *G01F 15/00* | (2006.01) |
| *A23L 2/52* | (2006.01) |

(52) U.S. Cl.
CPC .............. *G01F 11/18* (2013.01); *B65B 1/08* (2013.01); *B65B 1/36* (2013.01); *B65B 39/003* (2013.01); *B65B 39/007* (2013.01); *G01F 15/005* (2013.01); *G01F 15/18* (2013.01); *A23L 2/52* (2013.01); *A23V 2002/00* (2013.01)

(58) Field of Classification Search
CPC ........ G01F 11/18; G01F 15/005; G01F 15/18; B65B 39/003; B65B 39/007; B65B 1/36; B65B 1/08; A23V 2002/00; A23L 2/52

USPC .................................................. 53/467, 473
See application file for complete search history.

(56) References Cited

U.S. PATENT DOCUMENTS

| | | | |
|---|---|---|---|
| 1,145,139 A | 7/1915 | Henderson | |
| 1,438,595 A | 12/1922 | Hale | |
| 1,487,683 A | 3/1924 | Marsh | |
| 1,557,273 A | 10/1925 | Joseph | |
| 2,104,332 A | 1/1938 | Rohde | |
| 3,169,668 A | 2/1965 | Ziegler | |
| 3,699,740 A * | 10/1972 | Knabe ...................... | B67C 3/10 |
| | | | 53/432 |
| 4,655,029 A * | 4/1987 | Weiss ........................ | B67C 3/10 |
| | | | 141/6 |
| 5,016,684 A * | 5/1991 | Clusserath ................ | B67C 3/06 |
| | | | 141/39 |

(Continued)

FOREIGN PATENT DOCUMENTS

CH           6143173          11/1979

*Primary Examiner* — Donnell Long
(74) *Attorney, Agent, or Firm* — Klein, O'Neill & Singh, LLP

(57) ABSTRACT

The dispenser disclosed herein serves a single serving of a powdered nutrient contained within a container having multi-servings of the powdered nutrient. The dispenser has a metering device that operates as a ball valve or guillotine to dispense a single serving of the powdered nutrient into a water container. The dispenser also has a support surface that can be lowered and raised back up in order to fit a water container under the metering device and a distal tip of the metering device into a mouth of the water container so that no powdered nutrient spills out of the water container during transfer of the powdered nutrient from the metering device to the water container.

20 Claims, 26 Drawing Sheets

(56) References Cited

U.S. PATENT DOCUMENTS

| | | |
|---|---|---|
| 5,460,209 A | 10/1995 | Jandura |
| 5,975,366 A | 11/1999 | Ridgley |
| 6,293,440 B1 | 9/2001 | Weaver |
| 8,534,508 B2 | 9/2013 | Bush |
| 9,752,912 B2 | 9/2017 | Singer |
| 2008/0223877 A1 | 9/2008 | Gevorgian |
| 2011/0101023 A1 | 5/2011 | Chan |

* cited by examiner

SINGLE SERVE DISPENSER FOR A POWDERED NUTRIENT

CROSS-REFERENCE TO RELATED APPLICATIONS

This application is a continuation application of U.S. patent application Ser. No. 15/009,632, filed on Jan. 28, 2016, the entire content of which is expressly incorporated herein by reference.

STATEMENT RE: FEDERALLY SPONSORED RESEARCH/DEVELOPMENT

Not Applicable

BACKGROUND

The dispenser disclosed herein relates to a single serve dispenser for a powdered nutrient.

In today's quick paced environment, powdered nutritional food is one way to consume energy fast. Oftentimes, powdered nutritional food is provided in bulk to consumers in a large container containing multi-servings of the powdered nutritional food. Each time the consumer wants to consume the powdered nutritional food, the user must scoop out one or more servings of the powdered nutritional food into a bowl or cup to mix the powdered nutritional food with water or other fluids. Unfortunately, during the process of scooping the powdered nutritional food into the bowl or cup, the powdered nutritional food is spilled around the large container which must be later wiped up and cleaned. Moreover, such process is time-consuming.

Accordingly, there is a need in the art for a dispenser of powdered nutrient.

BRIEF SUMMARY

A dispenser is disclosed herein wherein the dispenser can serve a single serving of a powdered nutrient. The dispenser is removably attachable to a larger container containing the powdered nutrient and operative to receive and dispense single servings of the powdered nutrient directly from the larger nutrient container. The dispenser has a metering device that operates as a ball valve or a guillotine mechanism to dispense a single serving of the powdered nutrient. Moreover, a stand of the dispenser has a support surface biased in an up position that allows a water container to be slipped under the metering device after depressing the support surface to a down position. A dispensing tip of the metering device may be disposed within a mouth of the water container so that as the powdered nutrient is dispensed from the metering device, no powdered nutrient is spilled outside of the water container.

More particularly, a dispenser for dispensing a single serve of a powdered nutrient is disclosed. The dispenser may comprise a container, a metering unit and a stand. The container may hold two or more servings of the powdered nutrient. The container having an opening and a first part of a fastening system. The metering unit may define a measuring cup for measuring the single serve of the powdered nutrient and dispensing the measured powdered nutrient. The metering unit may have a second part of the fastening system wherein the first and second parts are removably attachable to each other so that the container is removable from the metering unit when the container is empty and a new container filled with the powdered nutrient is attachable to the metering unit. The stand may hold the metering unit above a surface.

The measuring cup may be a ball with a cavity with a volume equal to the single serve of powdered nutrient. The measuring cup may be rotated at least 180° so that the measuring cup is filled with the powdered nutrient then rotated 180° to empty the powdered nutrient in the measuring cup into a water bottle.

The metering unit may have a guillotine that may be traversed between an opened position and a closed position. The powdered nutrient may fill the measuring cup when the guillotine is traversed to the opened position and preventing a flow of the powdered nutrient to the measuring cup when the guillotine is traversed to the closed position. The guillotine may be biased to the closed position.

The dispenser may further comprise a vibration unit for facilitating removal of the powdered nutrient from the measuring cup into a water bottle. The vibration unit may be attached to the metering unit.

The first part of the fastening system may be a screw thread and the second part of the fastening system may be a mating screw thread.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
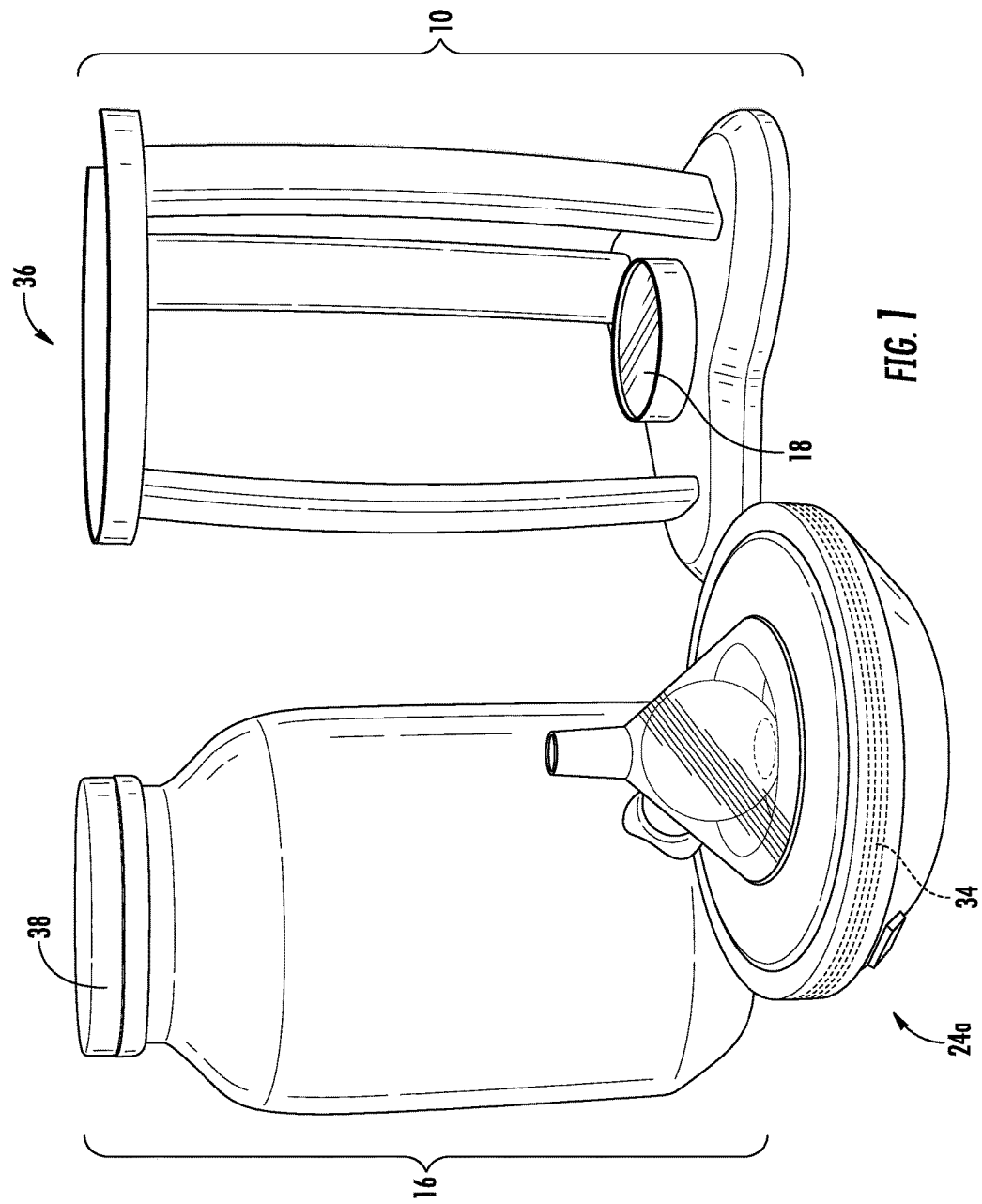
FIG. 1 illustrates a dispenser for powdered nutrient showing a first embodiment of a metering device and a nutrient container containing the powdered nutrient.
Figure 5:
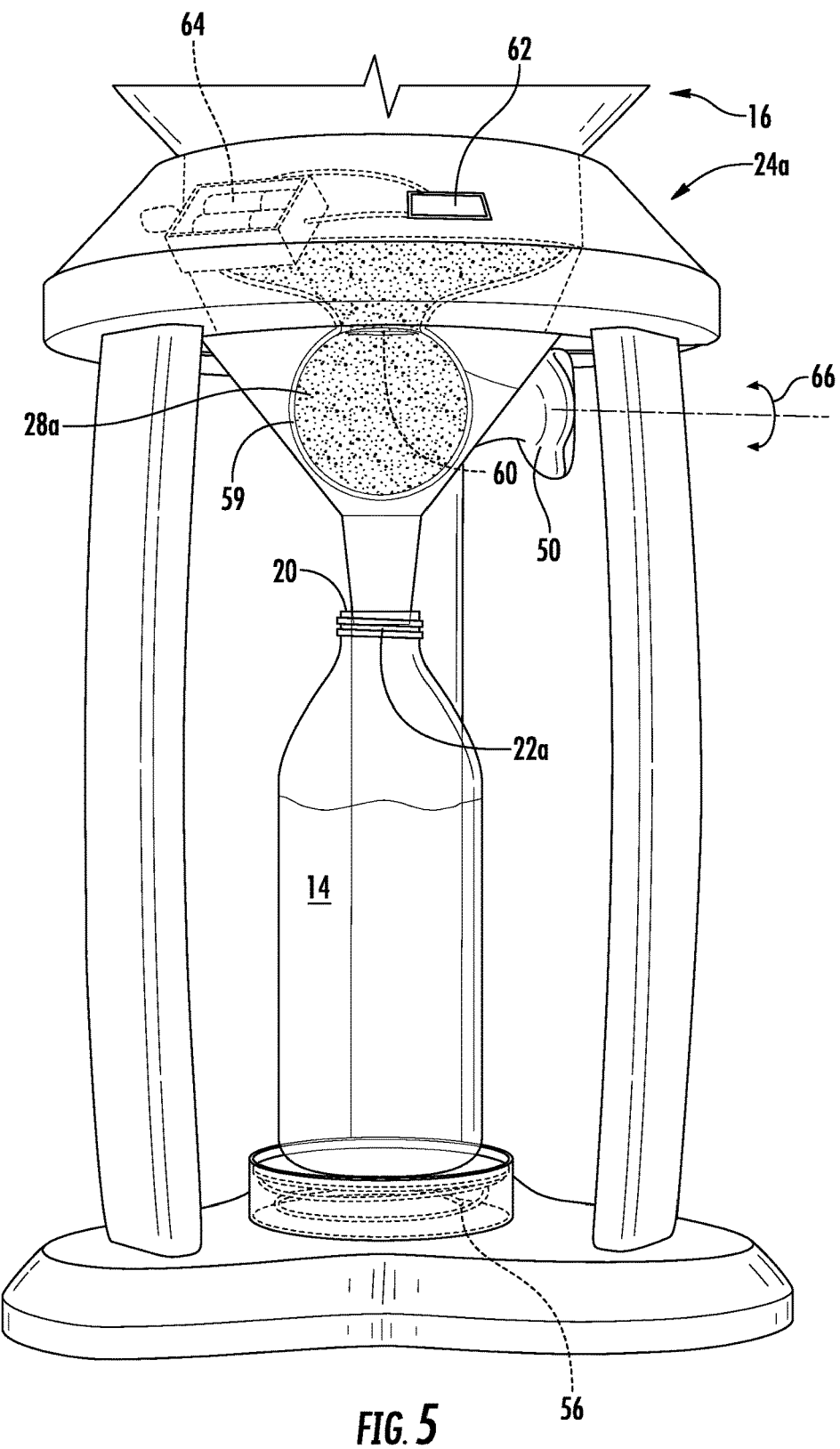
FIG. 5 illustrates the water container disposed under the metering device.
Figure 9:
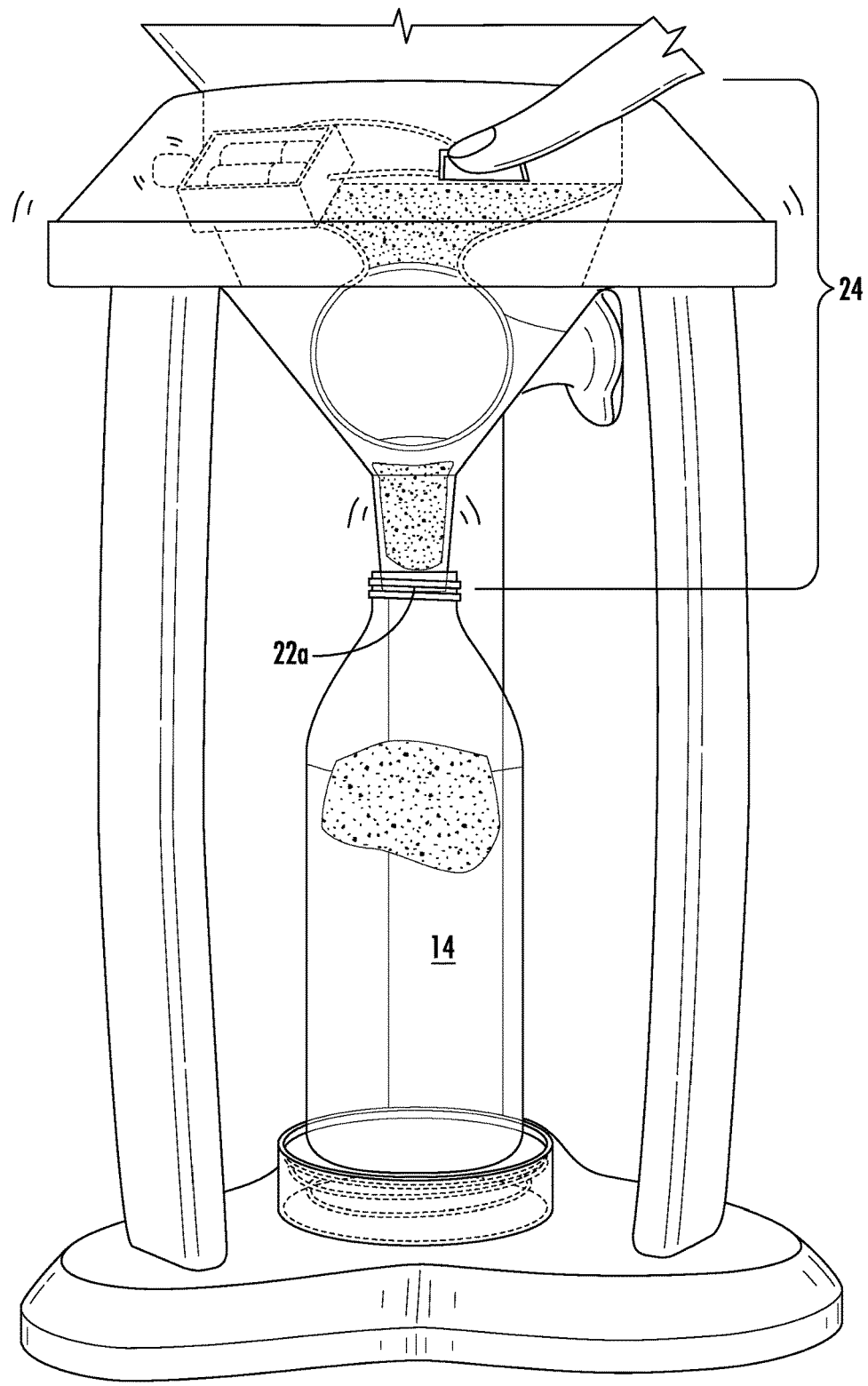
FIG. 9 illustrates action of the vibration device urging the powdered nutrient to be transferred from the measuring cup through its dispensing tip and into the water container.
Figure 11:
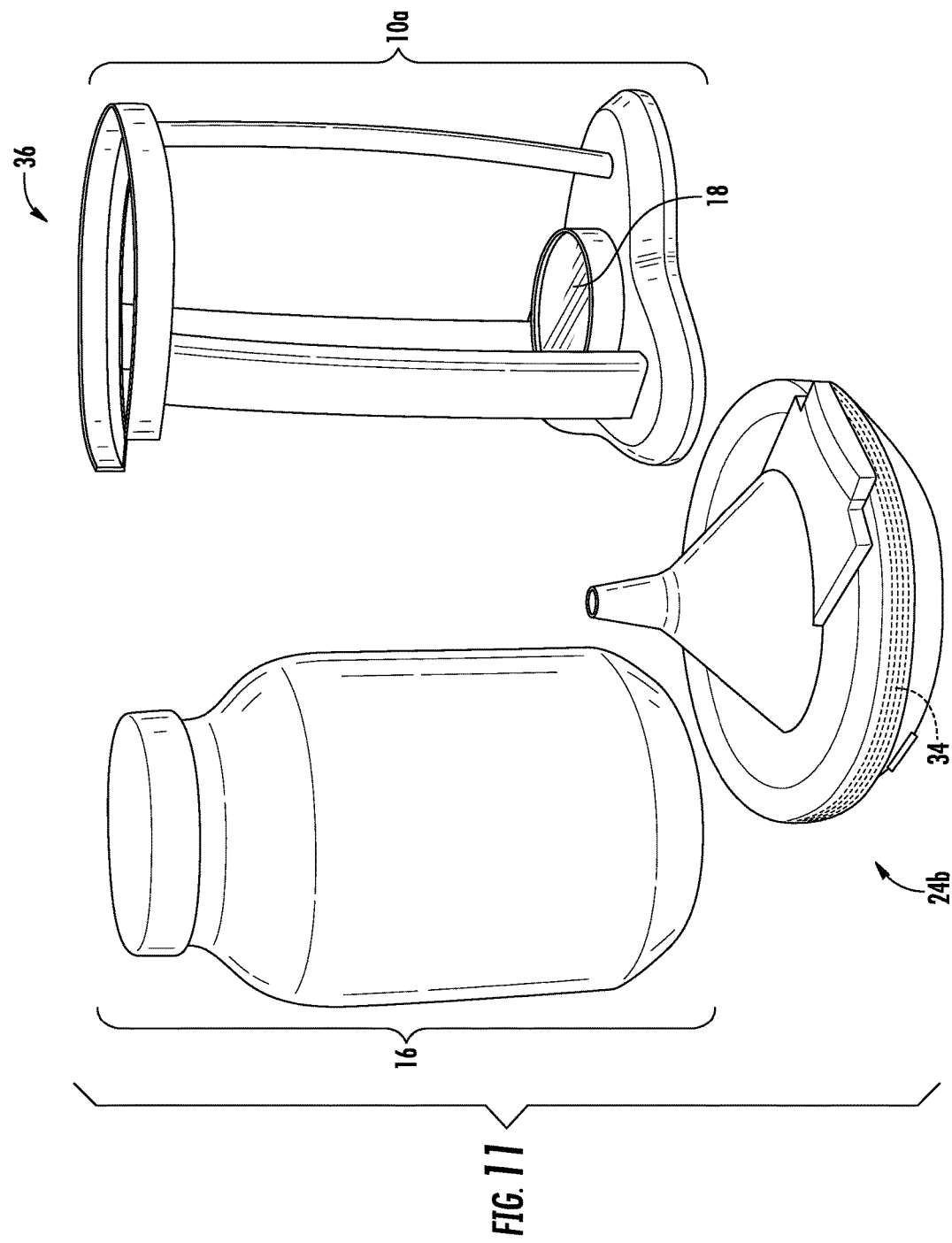
FIG. 11 illustrates the dispenser for powdered nutrient showing a second embodiment of the metering device and the nutrient container containing powdered nutrient.
Figure 14:
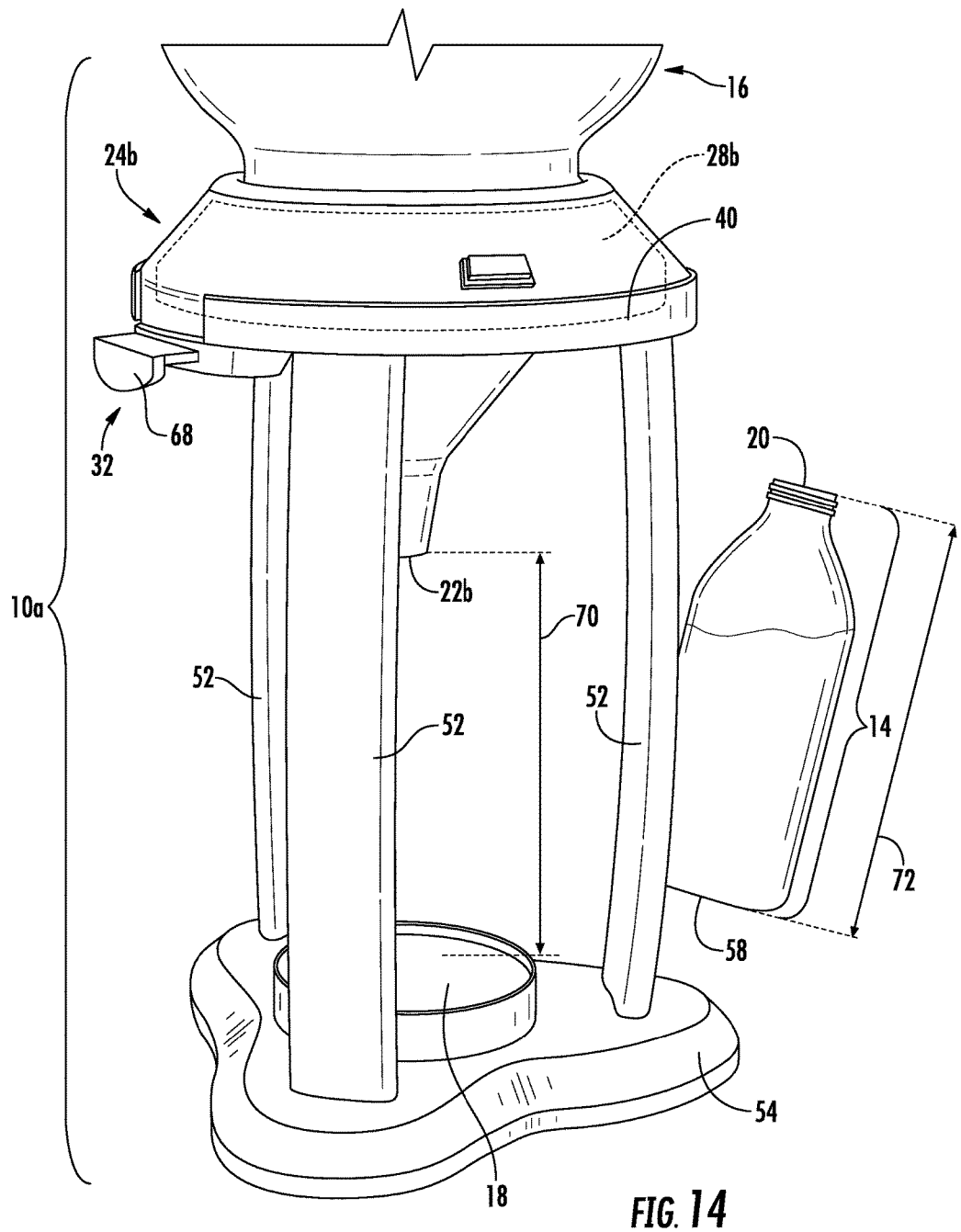
FIG. 14 illustrates the water container to be disposed under the metering device.
Figure 15:
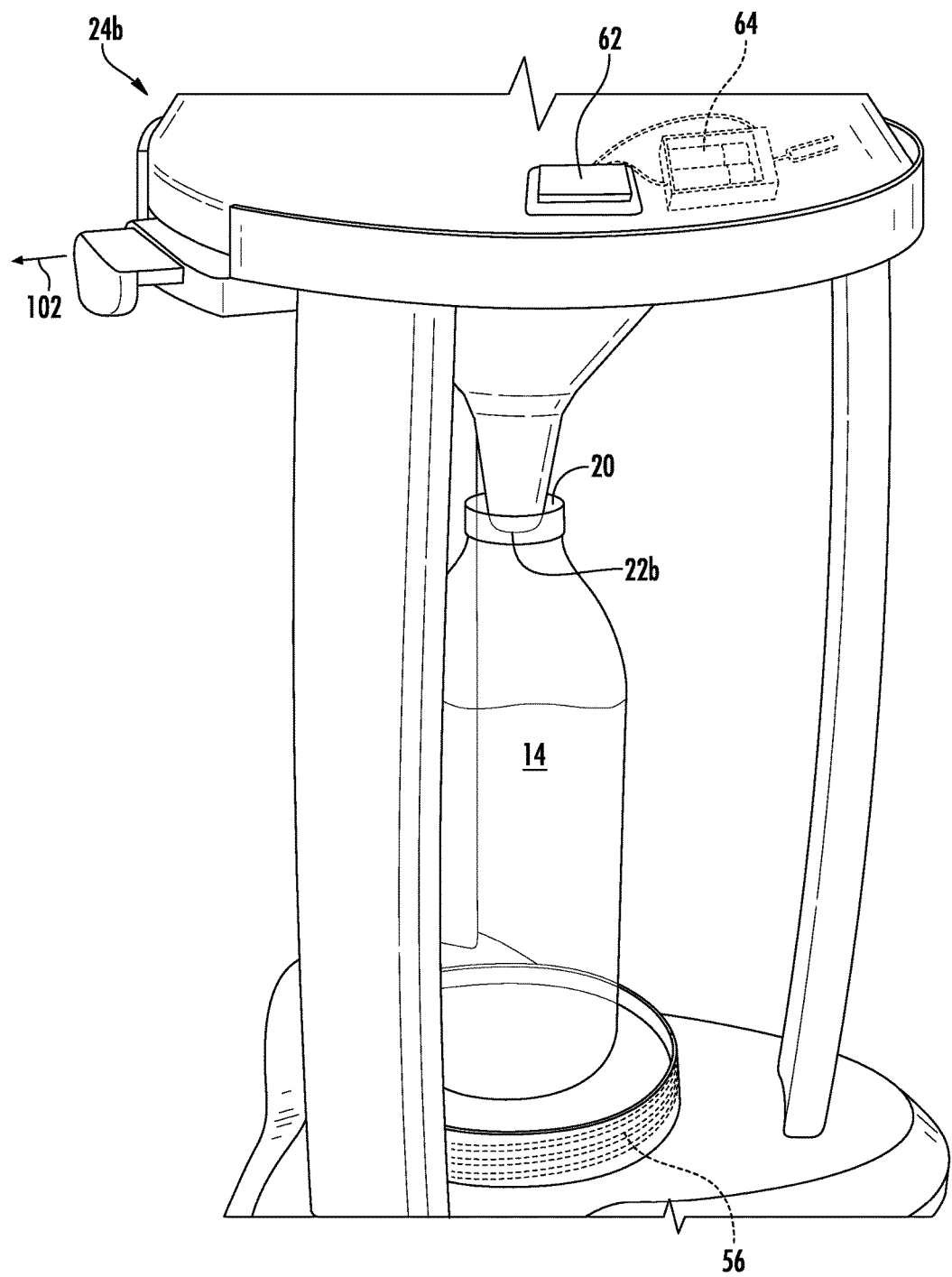
FIG. 15 illustrates the water container disposed under the metering device.
Figure 16:
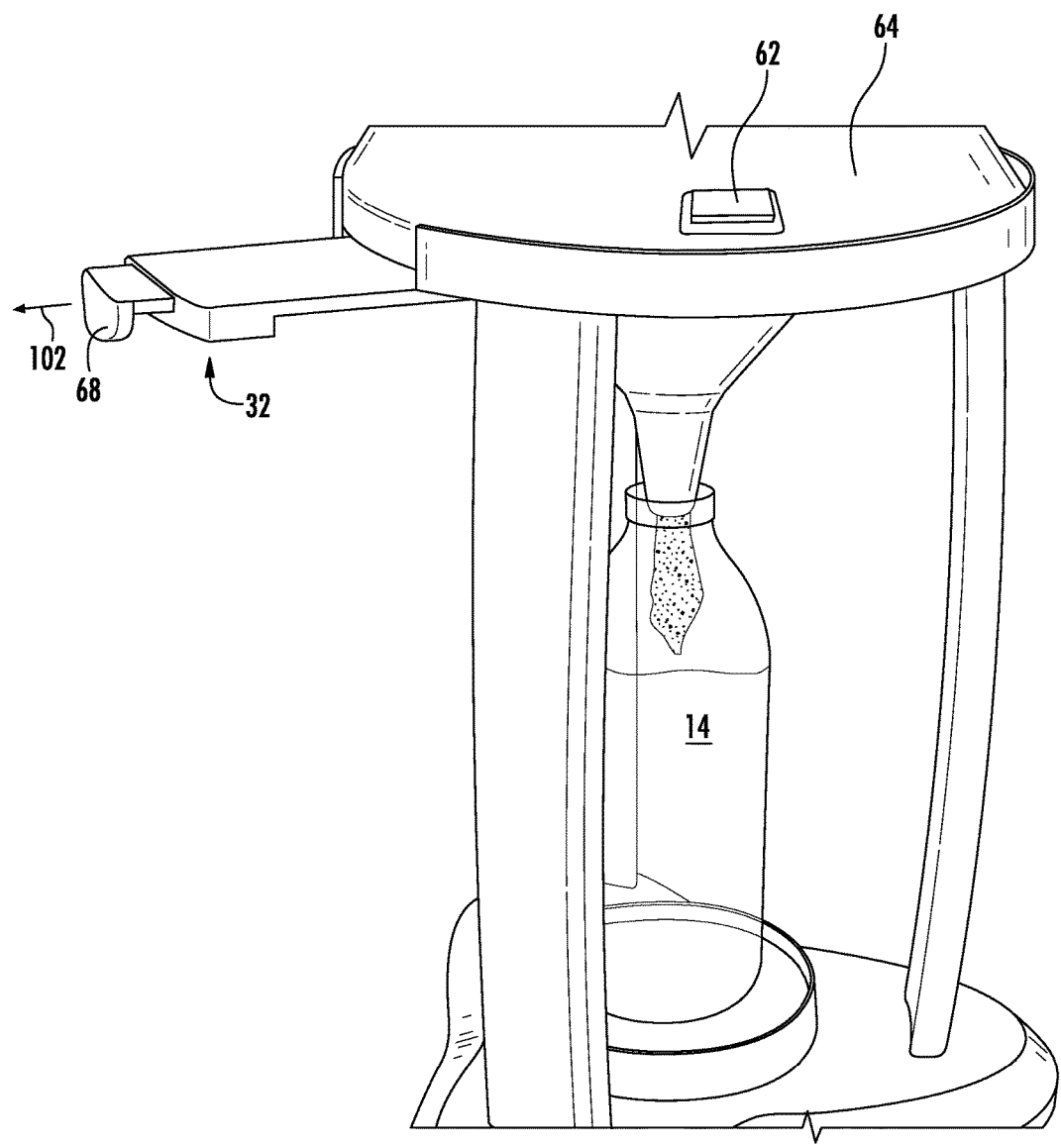
FIG. 16 illustrates pulling of a guillotine to fill a lower cavity of the metering device.
Figure 17:
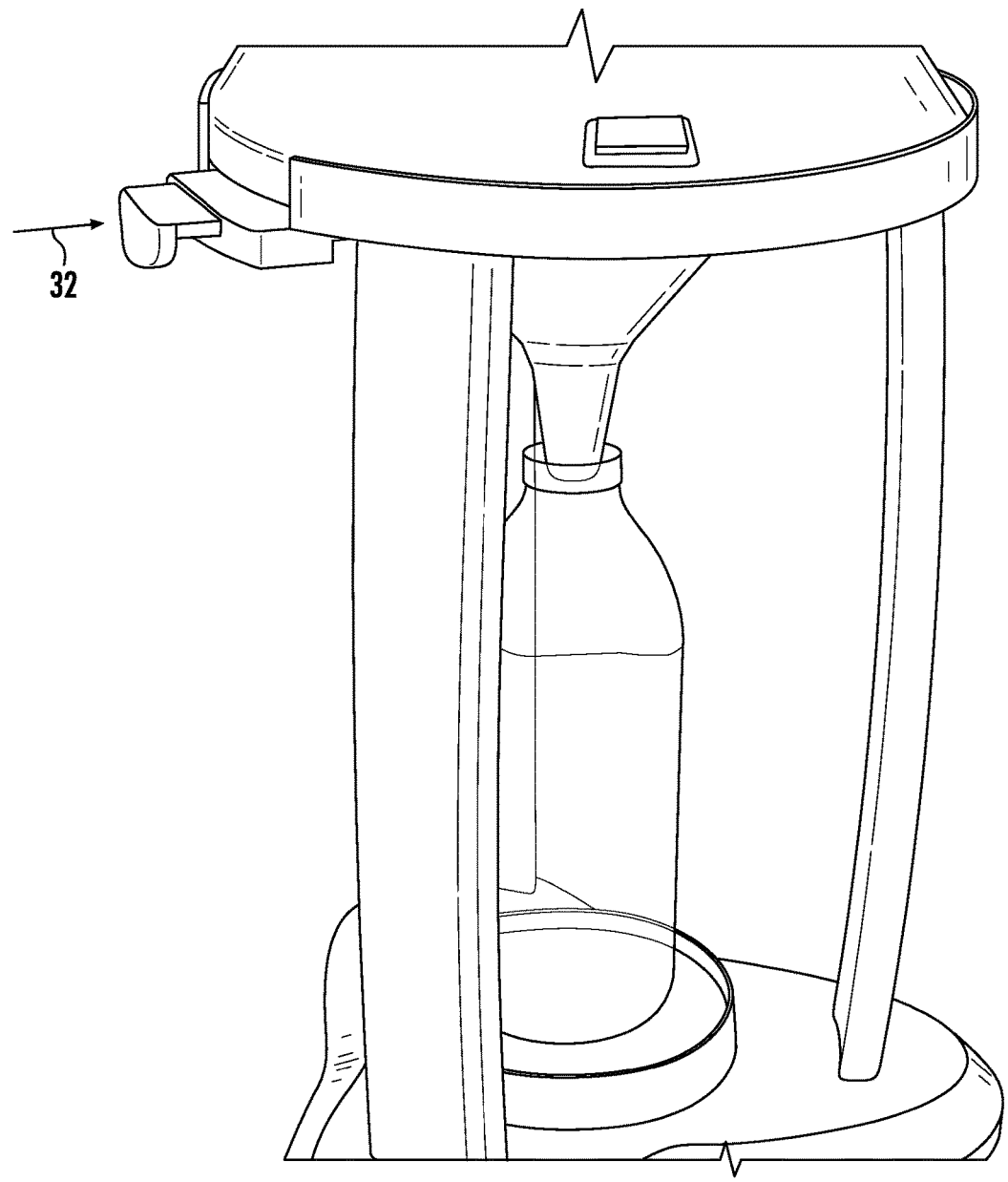
FIG. 17 illustrates the guillotine traversed back to its original position which separates upper and lower cavities of the metering device.
Figure 18:
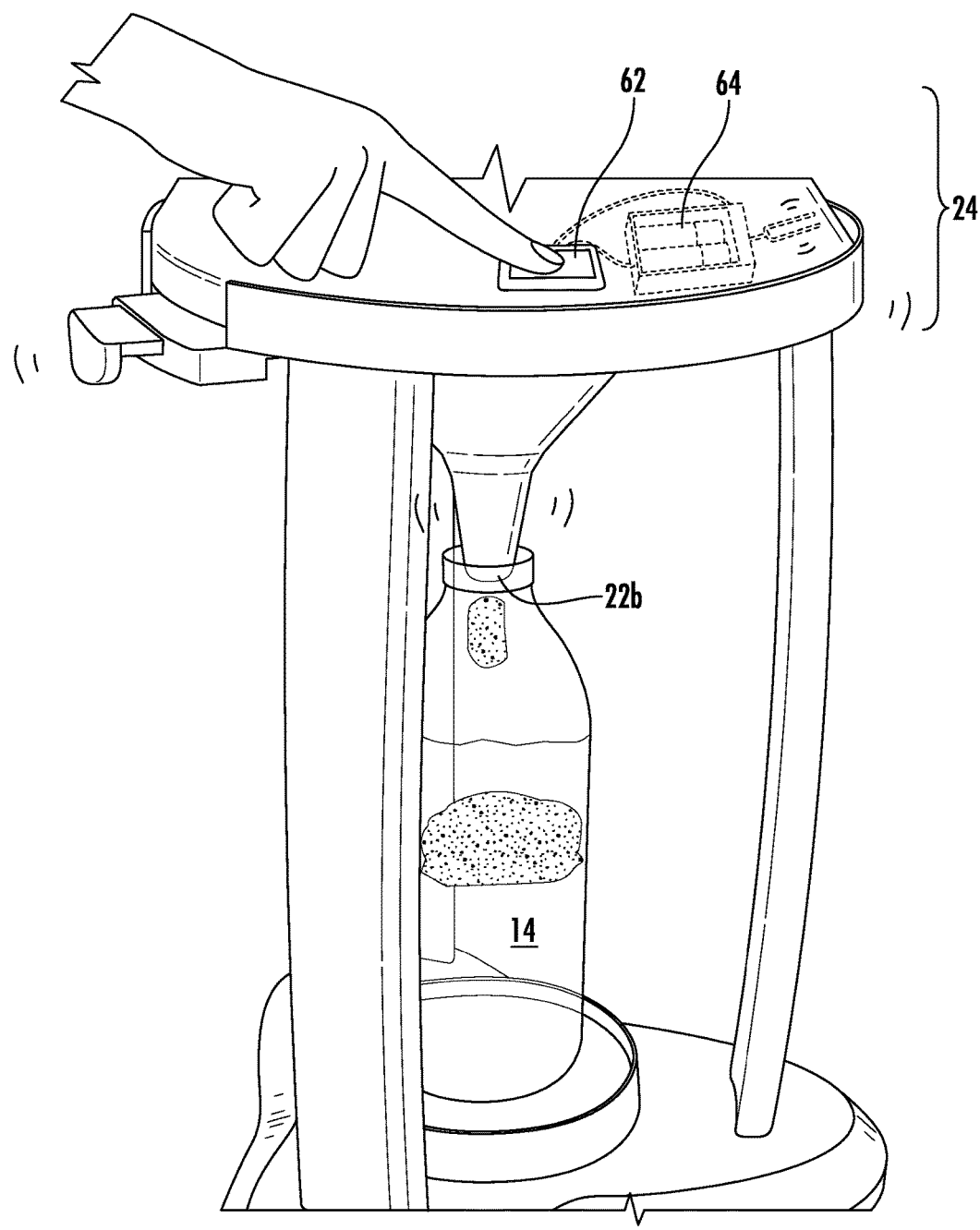
FIG. 18 illustrates vibration of the metering device in order to urge all of the powdered nutrient out of the metering device.
Figure 23:
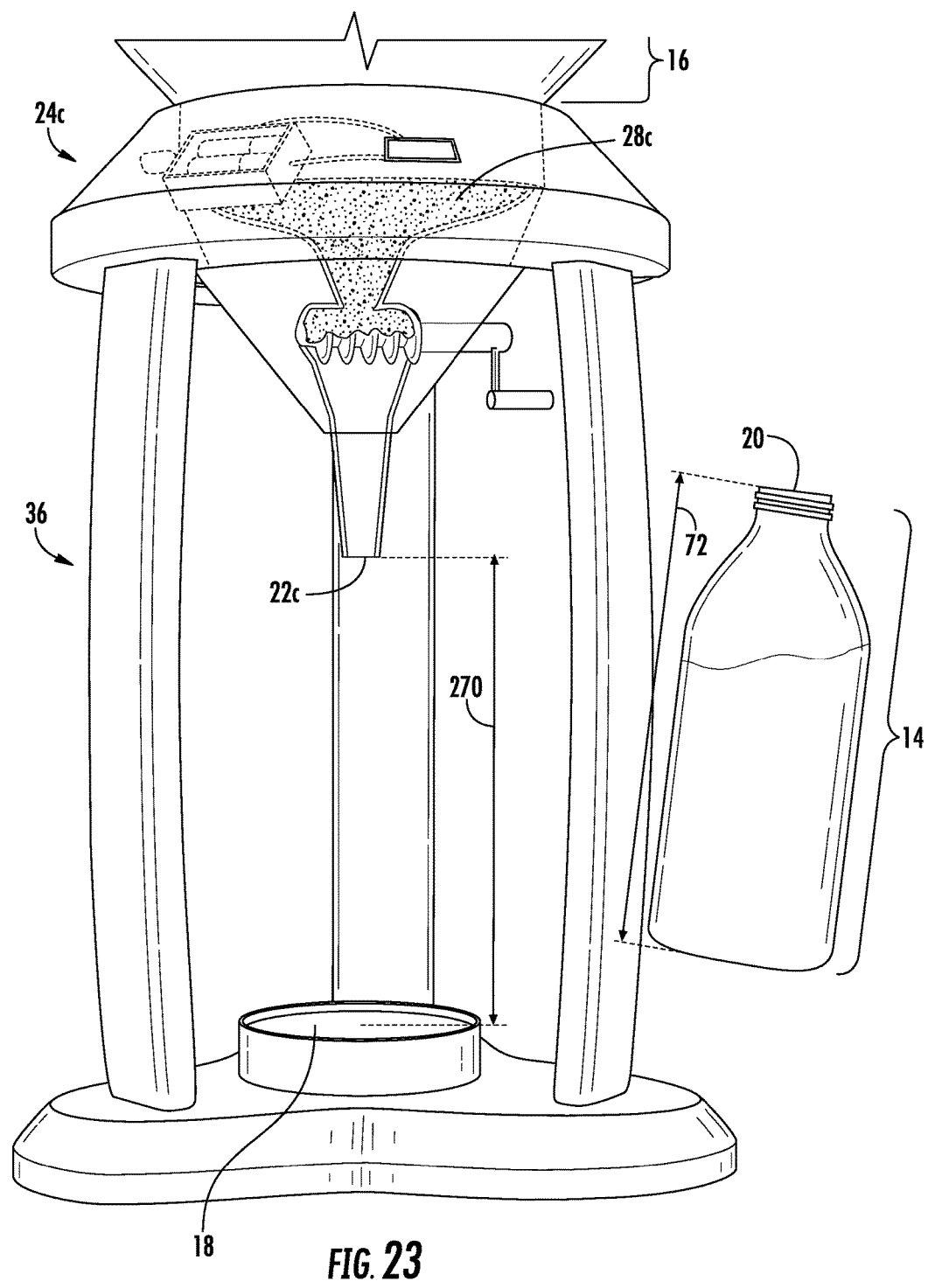
FIG. 23 illustrates the water container to be disposed under the metering device shown in FIG. 22.
Figure 24:
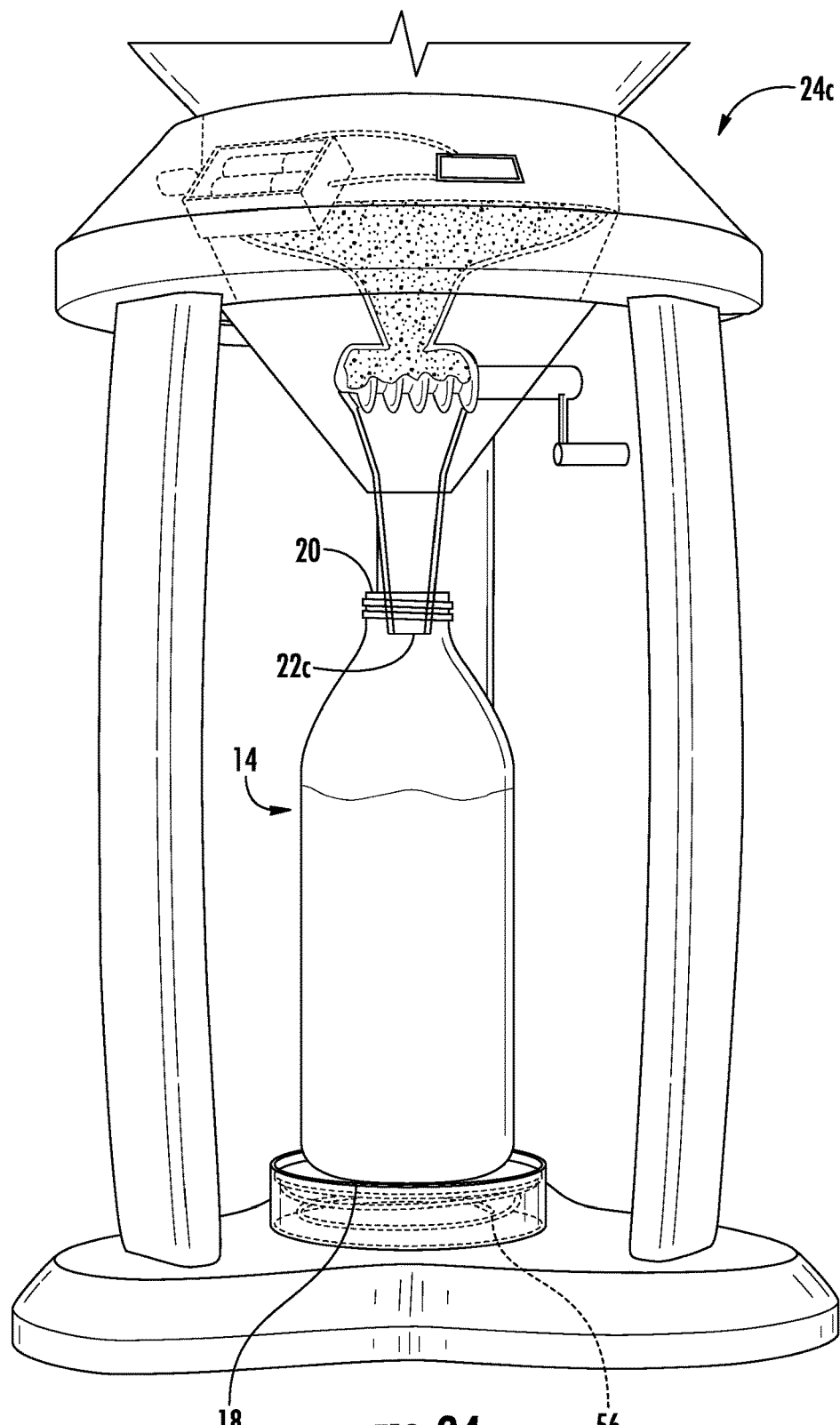
FIG. 24 illustrates the water container disposed under the metering device shown in FIG. 22.
Figure 25:
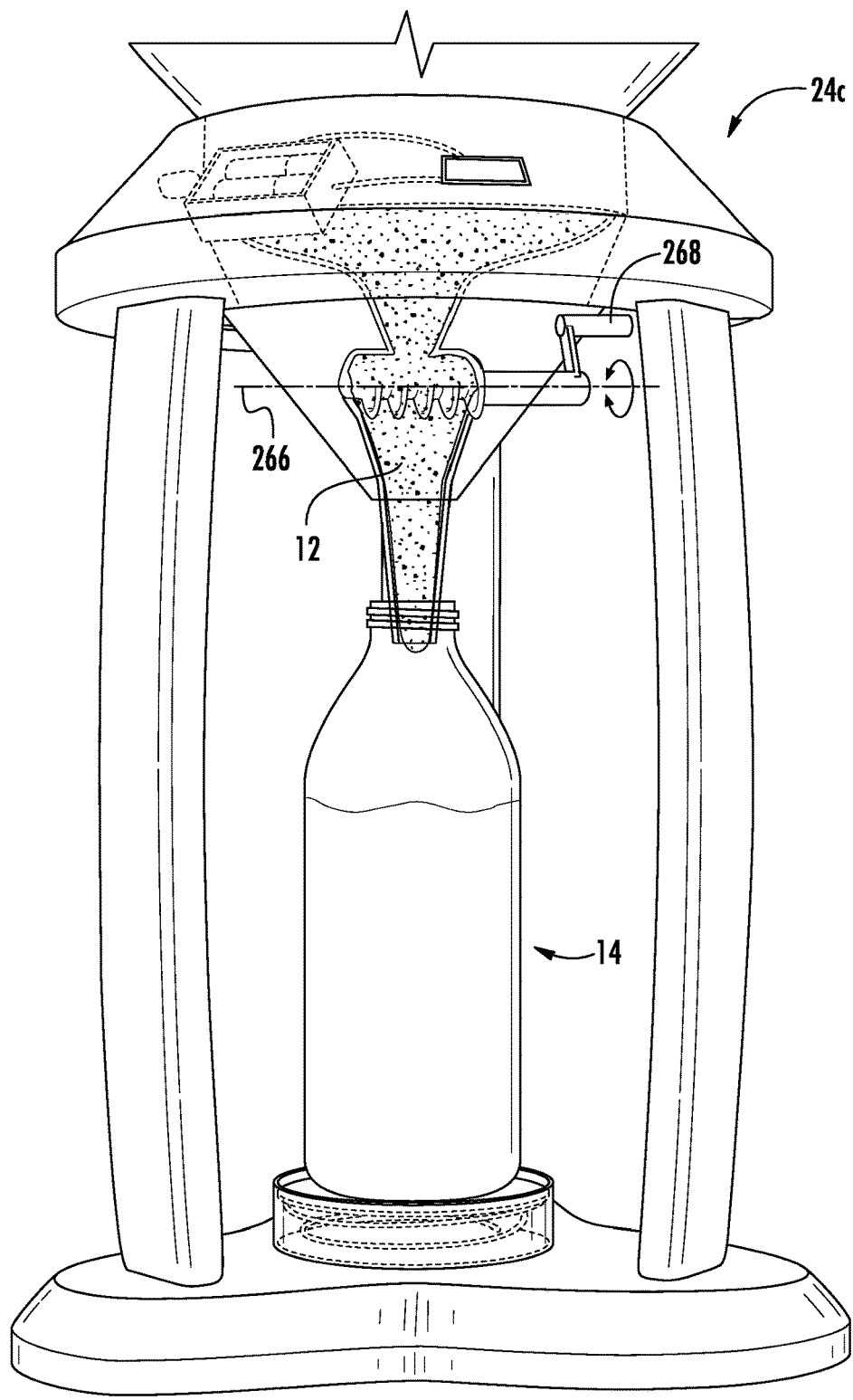
FIG. 25 illustrates an auger being rotated in order to transfer the powdered nutrient from the metering device into the water container.
Figure 26:
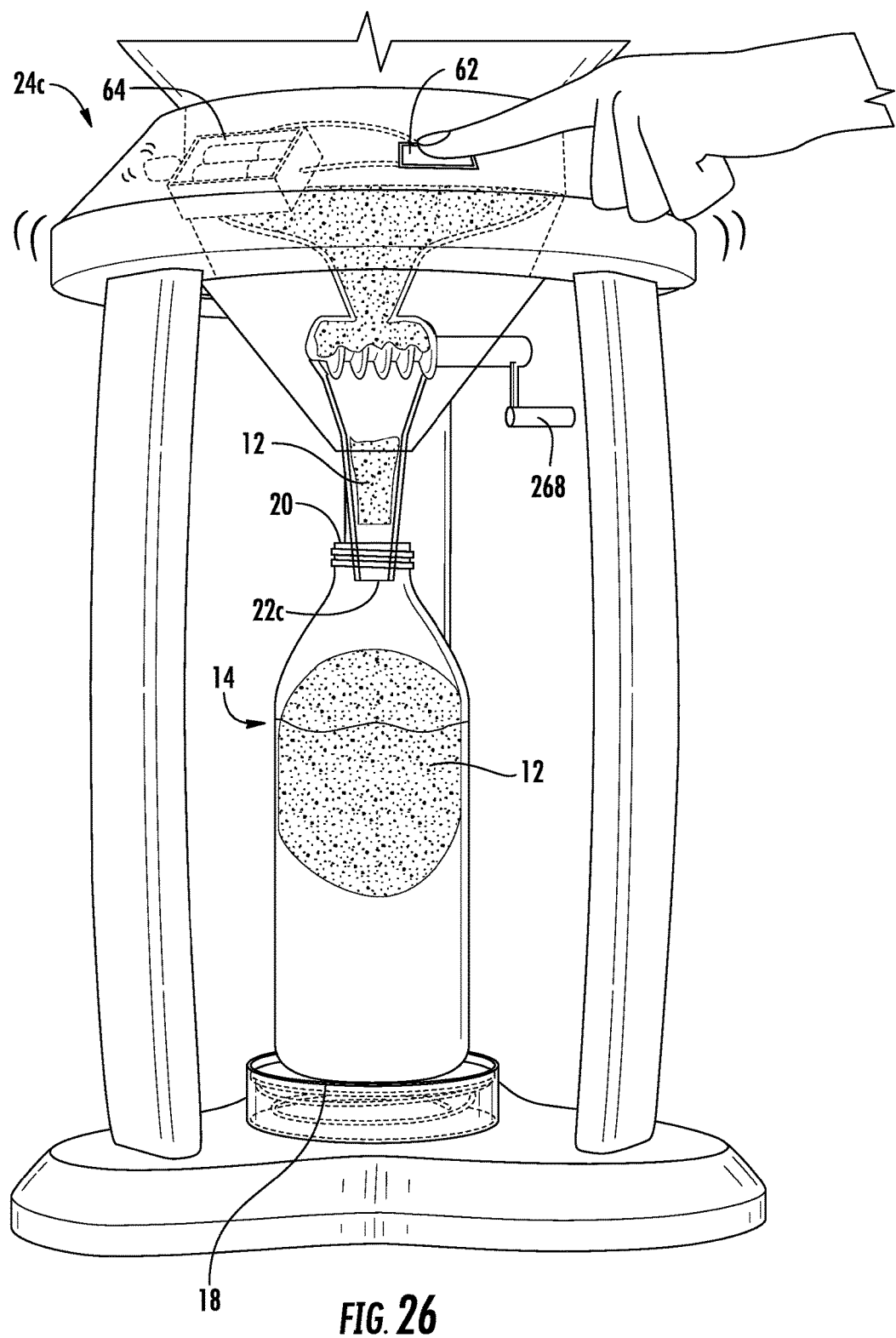
FIG. 26 illustrates the vibration device and the vibration button for facilitating and urging transfer of the powdered nutrient from the metering cup of the metering device into the water container.

Referring now to the drawings, a dispenser 10, 10a, 10b (see FIGS. 1, 11 and 20) for dispensing a single serving of a powdered nutrient 12 into a water container 14 is shown. The dispenser 10, 10a, 10b supports a nutrient container 16 above a support surface 18 which is traversable between a biased up position and a down position so that a mouth 20 of the water container 14 may receive a dispensing tip 22a, b, c of a metering device 24a, b, c as shown in FIGS. 5, 15 and 24. Moreover, the metering device 24a, b, c may have a vibration unit 62, 64 to facilitate extraction of the powdered nutrient 12 out of the dispensing tip 22a, b, c into the mouth 20 of the water container 14, as shown in FIGS. 9, 18 and 26. Since the dispensing tip 22a, b, c is disposed in the mouth 20 of the water container 14, the powdered nutrient 12 is directly inserted into the mouth 20 of the water container 14 and no possibility of a spill of the powdered nutrient 12 is possible. To dispense the powdered nutrient 12 from the nutrient container 16 to the water container 14, a metering cavity 28a, b, c (see FIGS. 5, 14 and 23) of the metering device 24a, b, c is filled with the powdered nutrient 12. In the dispenser 10 shown in FIG. 6, the metering cavity 28a is rotated 180° so that an opening 30 is traversed to be pointed downward and the powdered nutrient 12 in the metering cavity 28a is poured into the water container 14. In the dispenser 10a shown in FIG. 14, a guillotine 32 of the metering device 24b is pulled to drop the powdered nutrient from the metered cavity 28b into the dispensing tip 22b and into the water container 14 as shown in FIG. 16. The metering cavity 28a, b may be sized to equal a single serving of the powdered nutrient 12. In the dispenser 10b shown in FIG. 23, an auger is rotated to flow downward the powdered nutrient from the cavity 28c into the dispensing tip 22c and into the water container 14 as shown in FIGS. 25 and 26.

Figure 2:
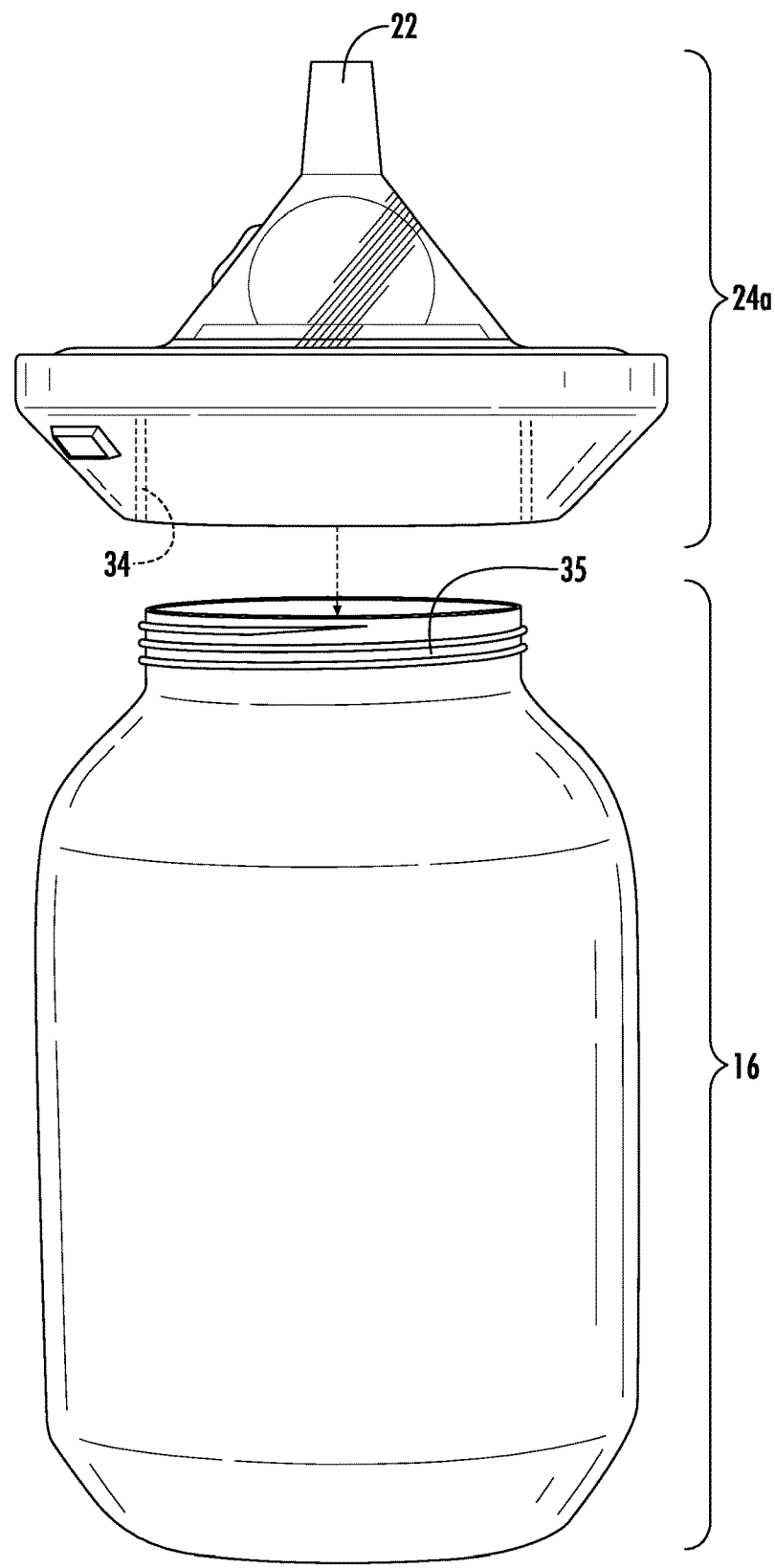
FIG. 2 illustrates attachment of the metering device shown in FIG. 1 with the nutrient container.

Referring now to a first embodiment of the metering device 24a shown in FIGS. 1-10, the metering device 24a may have internal threads 34 that are removably attachable to external threads 36 of the nutrient container 16, as shown in FIG. 2. Although the attachment mechanism between the metering device 24a, b and the nutrient container 14 is shown as being mating threads 34, 36, other attachment mechanisms may also be implemented including but not limited to over-center latches, friction fit, etc. so long as the powdered nutrient 12 contained in the nutrient container 16 does not leak out of the connection or attachment between the metering device 24a, b and the nutrient container 16.

The nutrient container 16 may have an interior volume sufficient to carry two or more servings of the powdered nutrient 12. Preferably, the nutrient container 16 has an interior volume sufficient to carry one hundred (100) or more servings of the powdered nutrient 12. The dispenser 10, 10a may be used as a point-of-sale device for selling single servings of the powdered nutrient 12 to potential customers that may want to purchase the powdered nutrient 12 in bulk. The customer is allowed to try a single serving before purchasing the powdered nutrient in bulk. To this end, the dispenser 10, 10a may be placed on a retail store countertop and customers may sample or buy a single serving of the powdered nutrient 12. Alternatively, the dispenser 10, 10a may also be used personally and placed on a countertop at a person's home, workout gym or office desk. The user dispenses a single serving of the powdered nutrient 12 as desired. In this regard, the dispenser may be purchased in combination with the powdered nutrient in the nutrient container.

Figure 3:
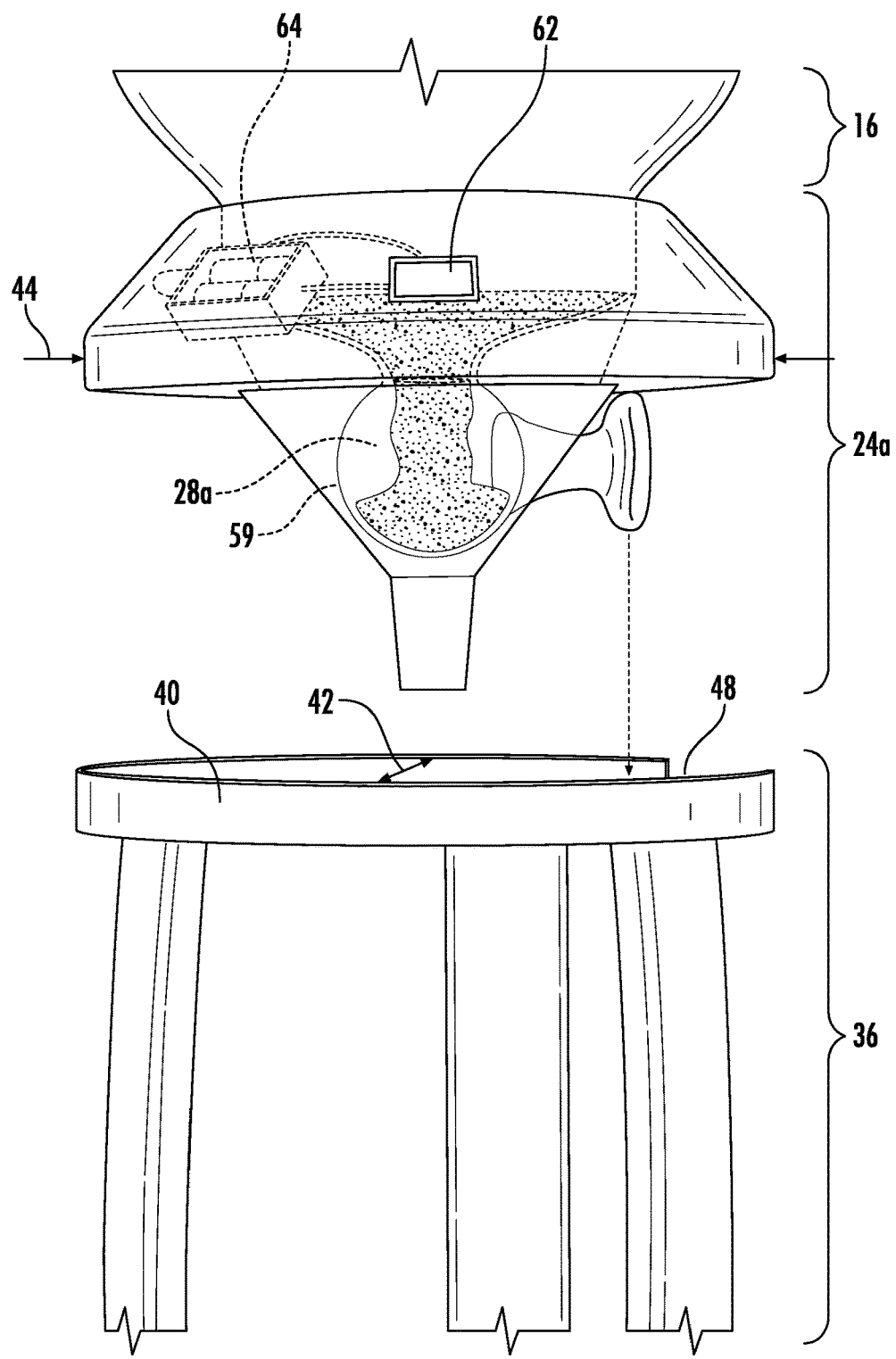
FIG. 3 illustrates mounting of the metering device with the nutrient container to a stand of the dispenser.
Figure 4:
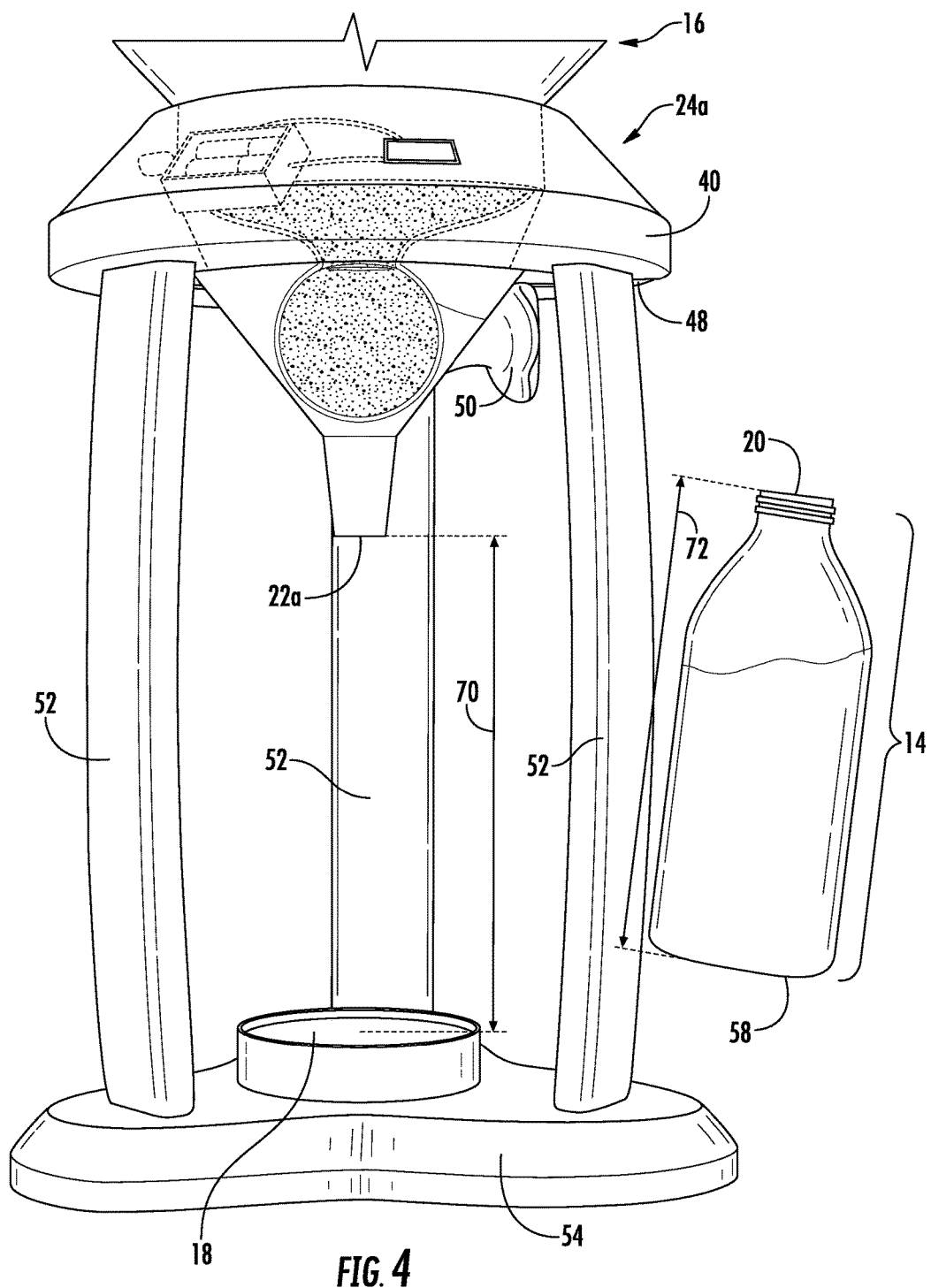
FIG. 4 illustrates a water container to be disposed under the metering device.
Figure 12:
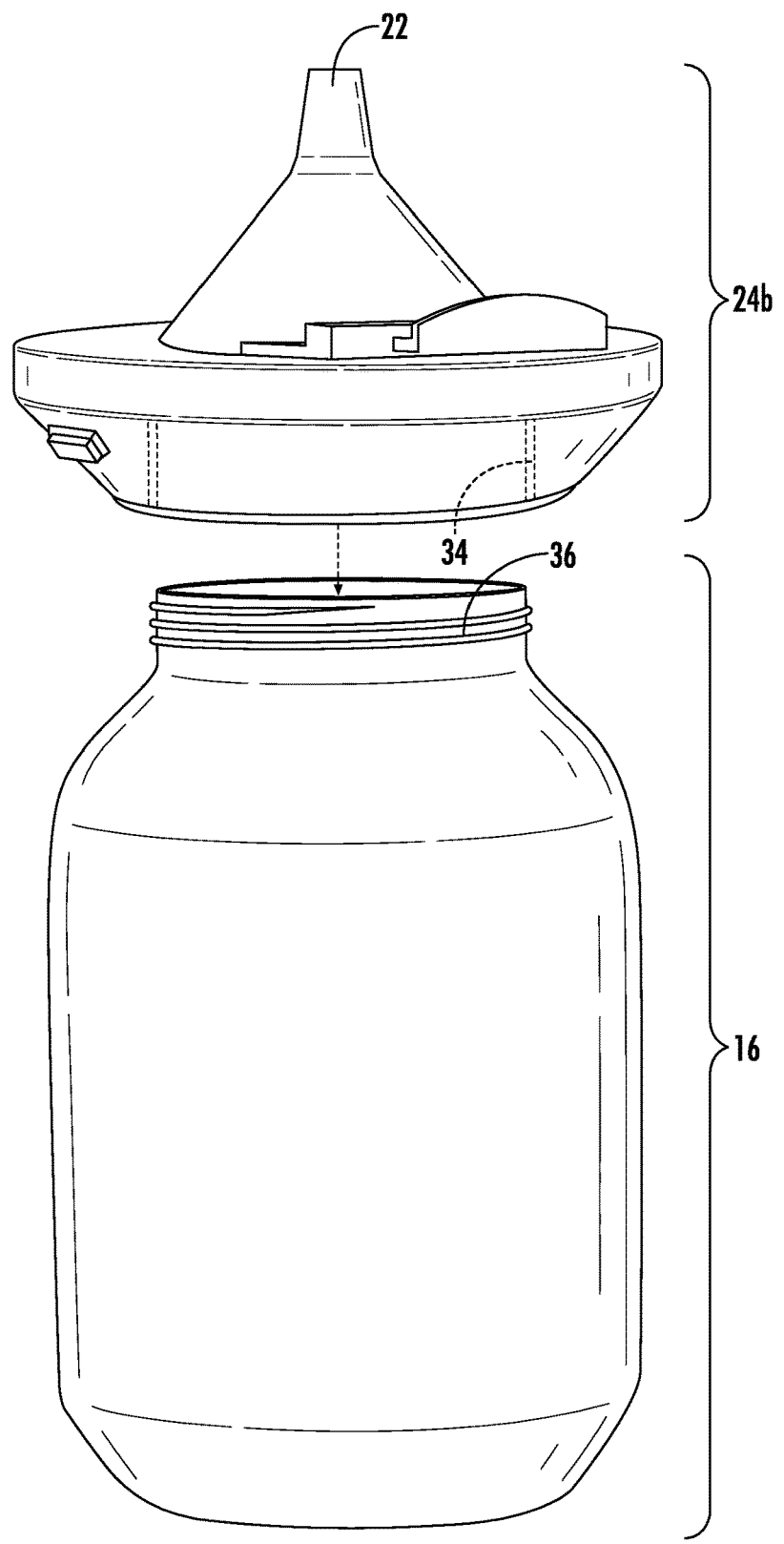
FIG. 12 illustrates attachment of the metering device shown in FIG. 11 with the nutrient container.
Figure 13:
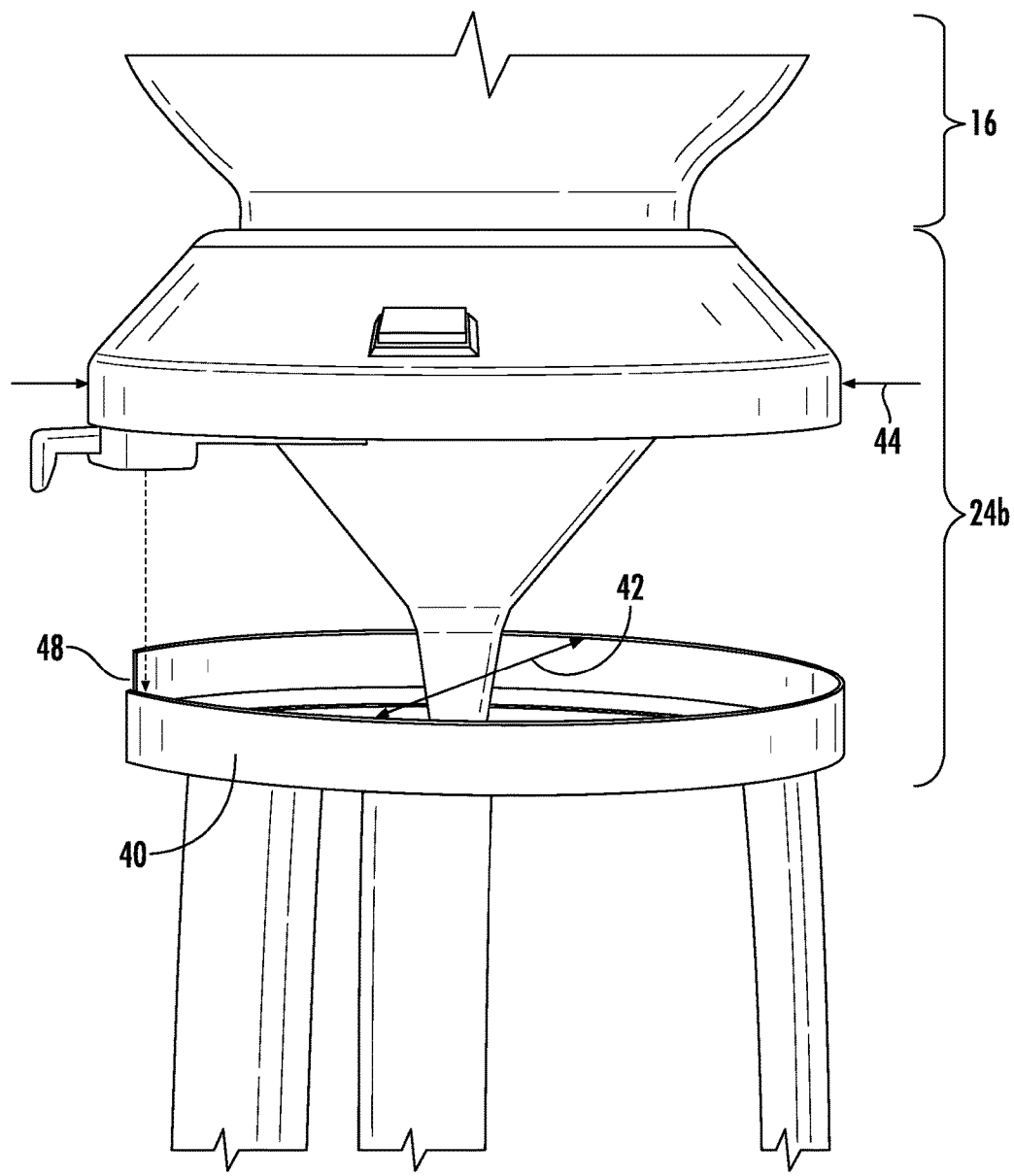
FIG. 13 illustrates mounting of the metering device with the nutrient container to the stand of the dispenser.

The dispenser 10, 10a may include a stand 36 and metering device 24a, b. The container 16 is secured to the metering device 24a, b by way of a threaded connection as shown in FIGS. 2 and 3 and FIGS. 12 and 13. To connect the metering device 24a, b to the container 16, a cap 38 of the container 16 is removed to expose the threads 35 of the container 16. The metering device 24a, b is inverted as shown in FIGS. 2 and 12 and threaded onto the threads 35 of the container 16. The powdered nutrient 12 in the container 16 cannot slip between the threaded connection between the metering device 24a, b and container 16. The only way that the powdered nutrient 12 is dispensed out of the container 16 is through the dispensing tip 22 of the metering device 24a, b as discussed herein. With the metering device 24a, b attached to the container 16, the metering device 24a, b and the container 16 are inverted as shown in FIGS. 3 and 13. The stand 36 of the dispenser 10 may have a collar 40 which receives and stabilizes the metering device 24a and the container 16 in the inverted position, as shown in FIGS. 4 and 14. In particular, the collar 40 may have a stepped circular configuration which receives a circular outer diameter 44 of the metering device 24a, b. An inner diameter 42 of the collar 40 may be sized and configured to an outer diameter 44 of the metering device 24a, b so as to have a friction fit therebetween. In this manner, any slight nudging of the container 16 does not cause the container 16 to fall off of the stand 36. The collar 40 may also have an opening 48 that allows the user to have access to a handle 50 of the metering device 24a when the metering device 24a is secured to the stand 36, as shown in FIG. 4 or a guillotine handle 68 of the metering device 24b, as shown in FIG. 14.

The stand 36 may additionally have a plurality of vertical support columns 52 that extend downward from the collar 40 and is attached to the base 54. The vertical support columns 52 are positioned so as to allow the water container 14 to be disposed underneath the dispensing tip 22a, b of the metering device and withdrawn therefrom to allow the user to consume the water and nutrient powder 12 in the water container 14. The base 54 may incorporate the support surface 18. The support surface 18 may be traversed between a biased up position as shown in FIGS. 4 and 14 and a depressed position to allow the water container 14 to be inserted under the dispensing tip 22a, b with the dispensing tip 22a, b at least partially inserted into the mouth 20 of the water container 14 as shown in FIGS. 5 and 15. In particular, the support surface 18 may have a spring 56 disposed underneath the support surface 18, as shown in FIG. 5. In order to place the water container 14 on the support surface 18, the user angles the water container 14 so that the bottom end 58 of the water container 14 contacts the support surface 18. The user pushes the support surface 18 down to the depressed position. At this moment, a distance 70 between the dispensing tip 22a, b and the support surface 18 is greater than a height 72 of the water container 14 as shown in FIGS. 4 and 14. The user can now rotate the water container 14 under the dispensing tip 22a, b so that the mouth 20 of the water container 14 is disposed directly beneath the dispensing tip 22a, b of the metering device 24a, b. In this position, the user releases the water container 14 to allow the water container 14 to be vertically traversed under power from the spring 56 (see FIGS. 5 and 15) as the support surface 18 resumes its biased up position. In this position, the water container 14 is slightly raised and the dispensing tip 22a, b is disposed within the mouth 20 of the water container 14, as shown in FIGS. 5 and 15.

The metering device 24a, b is in fluid communication with the container 16. In the first embodiment of the metering device 24a, a measuring cup 59 within the metering device 24a has an opening 60 that is pointed upward (see FIG. 3) so that the powdered nutrient 12 in the container 16 can flow downward and into a metered cavity 28a of the measuring cup 59, as shown in FIGS. 3 and 4. In order to ensure that the metered cavity 28a is completely filled with the powdered nutrient 12, the user may depress a vibration button 62 which actuates a vibration device 64 in the metering device 24a. The vibration device 64 vibrates the container 16 and the metering device 24a to urge the powdered nutrient 12 into the metered cavity 28a of the measuring cup 59.

Figure 6:
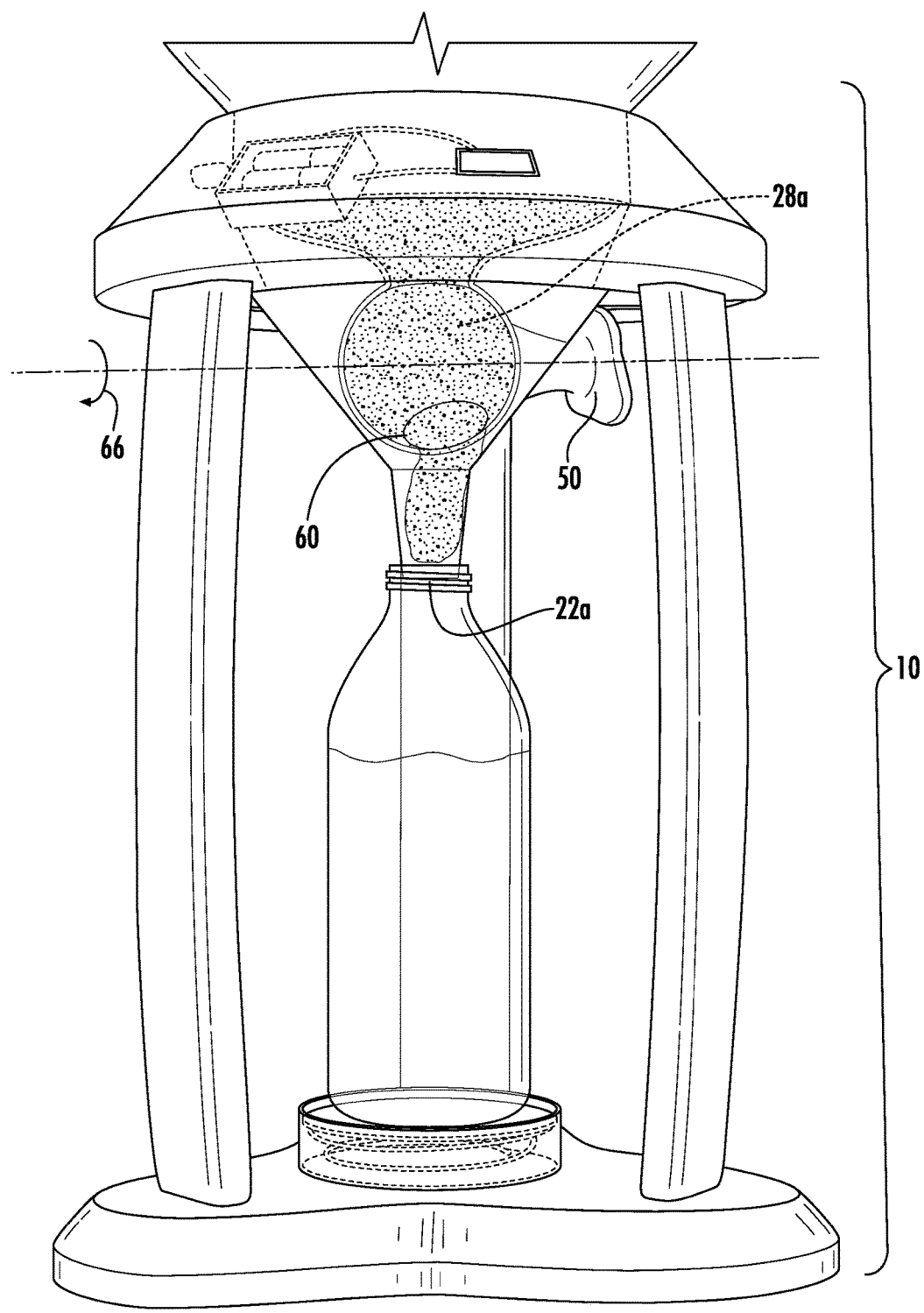
FIG. 6 illustrates a measuring cup of the metering device being rotated in order to transfer the powdered nutrient from the metering device into the water container.
Figure 7:
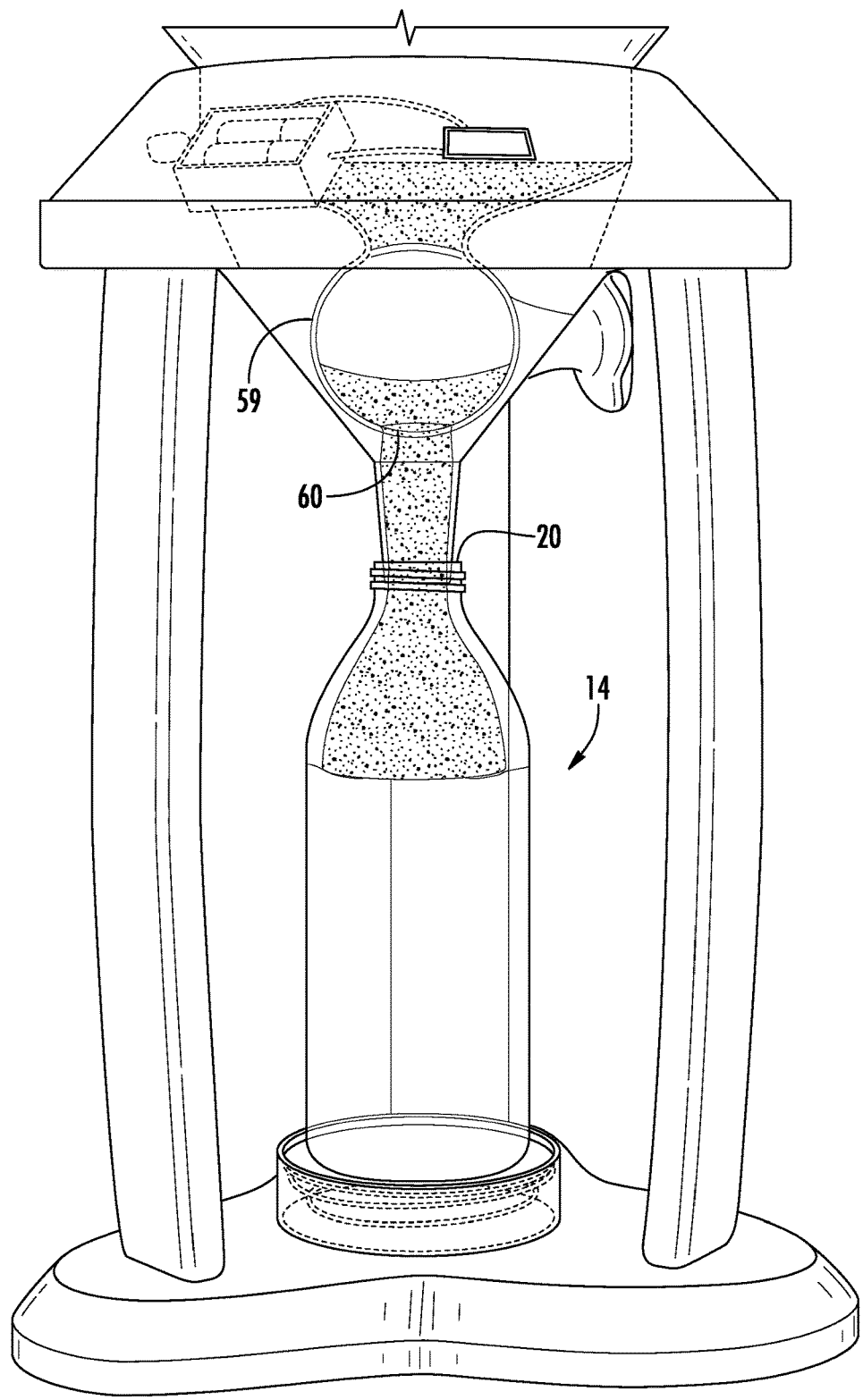
FIG. 7 illustrates the measuring cup of the metering device being fully rotated to transfer the powdered nutrient into the water container.
Figure 8:
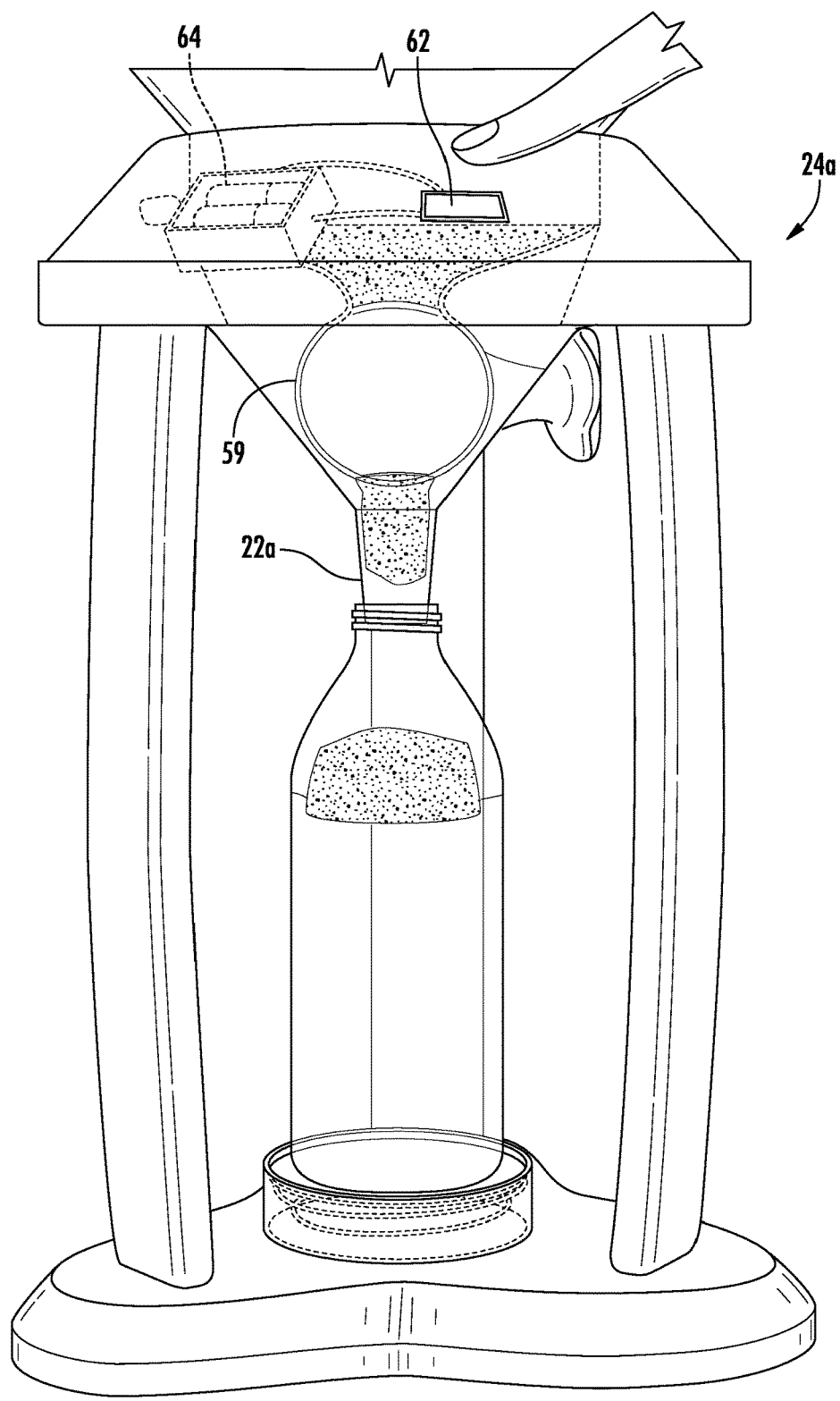
FIG. 8 illustrates a vibration device and a vibration button for facilitating transfer of the powdered nutrient from the metering cup of the metering device into the water container.

The user can either turn off the vibration device 64 by depressing the vibration button 62 again or leave the vibration device 64 on to continually impart a slight vibration to the metering device 24a as the user turns the handle 50 to have to powdered nutrient 12 transferred into the water container 14. When the opening 60 is pointed downward as shown in FIG. 7, a portion of the powdered nutrient 12 may be retained within the measuring cup 50a. To dispense all of the powdered nutrient 12 into the water container 14, the vibration 64 vibrates the powdered nutrient 12 in the measuring cup 50a to urge the powdered nutrient out of the measuring cup 50a. As shown in FIG. 6, as the handle 50 is rotated 180° as indicated by rotational arrow 66, the opening 60 begins to allow the powdered nutrient 12 to flow through the dispensing tip 22a. Once the handle is rotated 180°, the opening 60 is pointed downward into the mouth 20 of the water container 14. The powdered nutrient 12 is poured through the mouth 20 and into the water container 14. The vibration device 64 may be turned on before or after turning the handle 50 to orient the opening 60 downward to urge all of the powdered nutrient into the water container.

Figure 10:
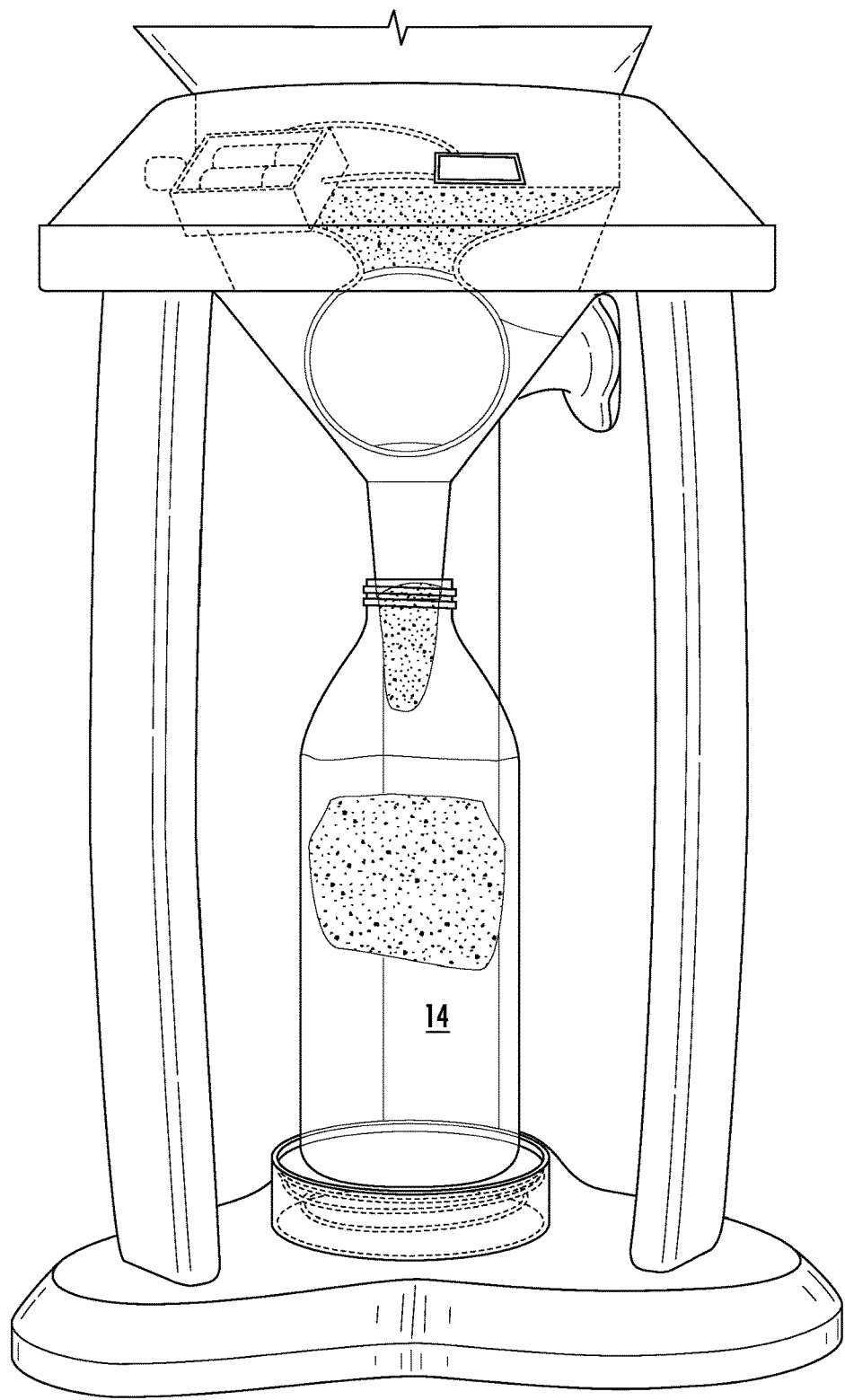
FIG. 10 illustrates the powdered nutrient being dispensed into the water container.

If the vibration device 64 was turned off or was never turned on, then a small amount of powdered nutrient 12 may remain stuck within the measuring cup 59 or the dispensing tip 22a of the metering device 24a. To allow the powdered nutrient 12 or all of the powdered nutrient 12 to be poured out of the measuring cup 59 and the dispensing tip 28, the user may turn the vibration device 64 on by depressing the vibration button 62. The vibration urges the powdered nutrient 12 to completely flow into the water container 14 as shown in FIGS. 9 and 10.

The user may grip the water container 14 and press downward on the support surface 18 in order to compress spring 56 which allows the user to tilt the water container 14 away from the dispensing tip 22a and remove the water container 14. The user may put a cap 38 of the water container 14 back on in order to shake and mix the powdered nutrient 12 and the water in the water container 14 together. The cap 38 is removed from the water container 14 so that the user can drink the powdered drink.

The handle 50 can be rotated 180° so that the opening 60 is realigned back to the container 16 and the powdered nutrient 12 in the nutrient container 16 fills the measuring cup 59 back up again. The next user can then place a water container 14 under the dispensing tip 22 as explained above and rotate the handle in order to dispense more powdered nutrient 12 in the water container 14.

The measuring cup 59 has a metered cavity 28a so that a predefined quantity or volume of powdered nutrient 12 is disposed in the measuring cup 59.

Figure 19:
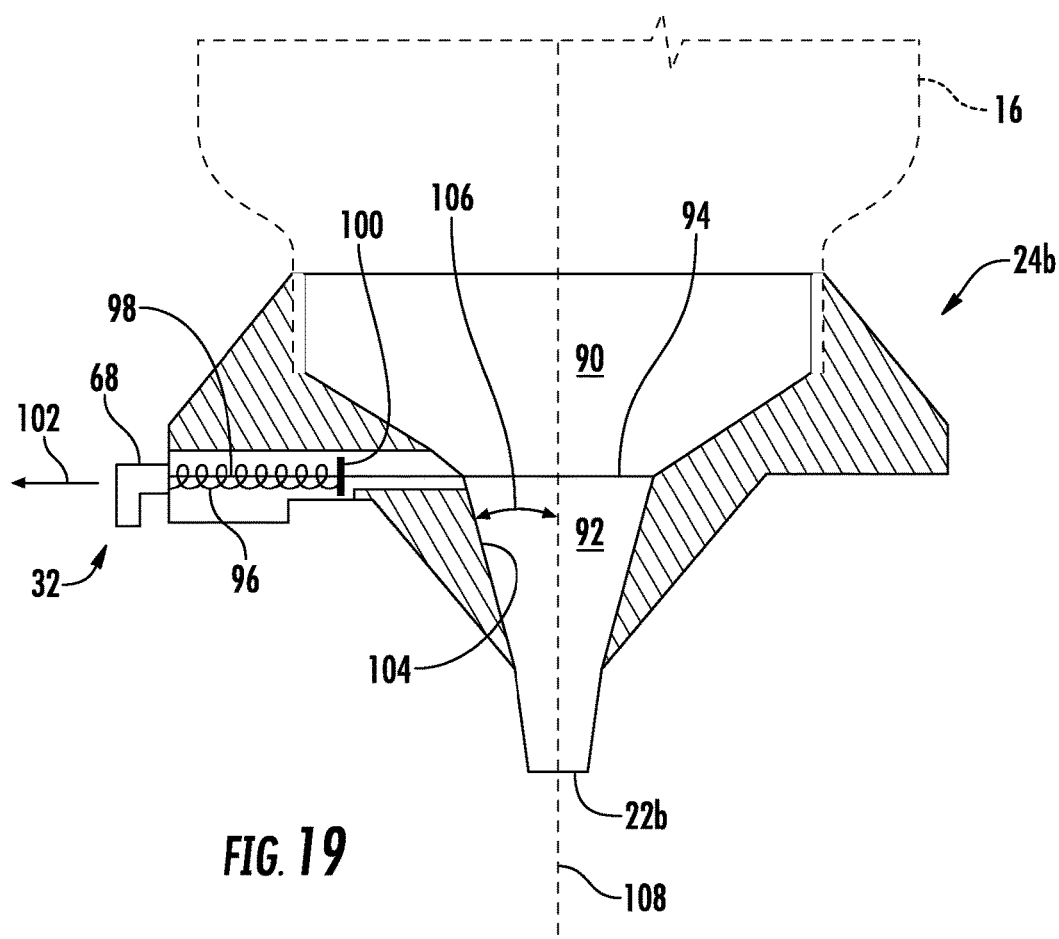
FIG. 19 is a cross-sectional view of the second embodiment of the metering device.

In the second embodiment of the metering device 24b, an internal space of the metering device 24b may be separated into an upper cavity 90 and a lower cavity 92, as shown in FIG. 19. The powdered nutrient disposed in the nutrient container 16 flows first into the upper cavity 90 and is stopped by a guillotine 32. The guillotine 32 has the handle 68, a blade 94, a return spring 96 and a return spring rod 98. At the end of the rod 98, a stop plate 100 is used to compress the spring 96 when the handle 68 is pulled in the direction of arrow 102 in order to transfer the powdered nutrient 12 from the upper cavity 90 to the lower cavity 92. The volume of the lower cavity 92 may be equal to a single serving of the powdered nutrient 12. Additionally, it is also contemplated that the volume of the lower cavity 92 may be equal to two or more servings of the powdered nutrient 12. When the guillotine 32 is pulled in the direction of arrow 102, the powdered nutrient 12 is transferred and fills up the lower cavity 92. When the guillotine 32 is released, the upper and lower cavities 90, 92 are now separated by the blade 94. The vibration device 64 is turned on to vibrate the powdered nutrient out of the lower cavity 92 through the distal tip 22b and into the water container 14.

Referring now to FIG. 15, powdered nutrient 12 may be disposed within the lower cavity 92. The blade 94 separates the upper and lower cavities 90, 92. The user may depress the vibration button 62 to actuate the vibration device 64. The distal tip 22b of the metering device 24b is not closed but is opened. When the powdered nutrient 12 is filled into the lower cavity 92 upon pulling of the guillotine 32 in the direction 102, a small amount of the powdered nutrient 12 may now fall through the distal tip 22b. However, a majority of the powdered nutrient 12 is stuck within the lower cavity 92. As shown in FIG. 19, a side wall 104 of the lower cavity 92 may have an angle 106 with respect to a vertical axis 108 by adjusting the sidewall 104 and the angle 106 vertical axis; the volume of the lower cavity 92 may be increased by decreasing such angle 106 or decreased by increasing such angle 106. As the angle 106 is increased, less of the powdered nutrient 12 simply flows through the distal tip 22b and remains stuck within the lower cavity 92. The angle 106 and the cavitational volume of the lower cavity 92 may be sized and configured so that when the guillotine 32 is traversed in the direction of arrow 102 and the blade 94 is traversed to allow the powdered nutrient to flow in the lower cavity 92, a predetermined amount of powdered nutrient 12 is flowed into the lower cavity 92 which is now ready to be dispensed into the water container 14.

With the powdered nutrient 12 disposed within the lower cavity 92, as discussed above, the user releases the guillotine to insert the blade 94 between the upper and lower cavities The user may then depress the vibration button 62 which vibrates the metering device 24b. The vibration from the vibration device 64 gently vibrates the metering device 24b and slowly but surely vibrates all of the powdered material within the lower cavity 92 into the water container 14.

In FIG. 15, the lower cavity 92 may be empty and not filled with the powdered nutrients. To fill the lower cavity 92 with powdered nutrient 12, the user pulls on the handle 68 in the direction of arrow 102. In doing so, the blade 94 (see FIG. 19) is moved out of the way laterally so that powdered nutrient 12 in the upper cavity 90 is flowed into the lower cavity 92. The bottom distal tip 22b of the metering device 24b is not closed and always remains opened. As such, when the guillotine 32 is pulled, some of the powdered nutrient 12 escapes out of the distal tip 22b as shown in FIG. 16. The user then releases the guillotine 32. As shown in FIG. 19, the spring 96 when the guillotine 32 is pulled in the direction of arrow 102 is compressed. When the user releases the guillotine 32, the spring pushes the guillotine back so that the blade 94 is now separating the upper and lower cavities 90, 92. In order to flow the powdered nutrient 12 out of the lower cavity 92 and into the water container 14, the user may now depress the vibration button 62 to activate the vibration device 64 which in turn flows the powdered nutrient 12 out of the lower cavity 92 and into the water container 14.

The user may now grip the water container 14 and press downward on the support surface 18 in order to compress spring 56 which allows the user to tilt the water container 14 away from the dispensing tip 22b and remove the water container 14. The user may put a cap 38 of the water container 14 back on in order to shake and mix the powdered nutrient 12 and the water in the water container 14 together. The cap 38 is removed from the water container 14 so that the user can drink the powdered drink 12.

When the next user wants to sample a single serving of the powdered nutrient 12, the user disposes his or her water container 14 under the dispensing tip 22b and pulls on the guillotine 32 in order to start the process over again.

Figure 22:
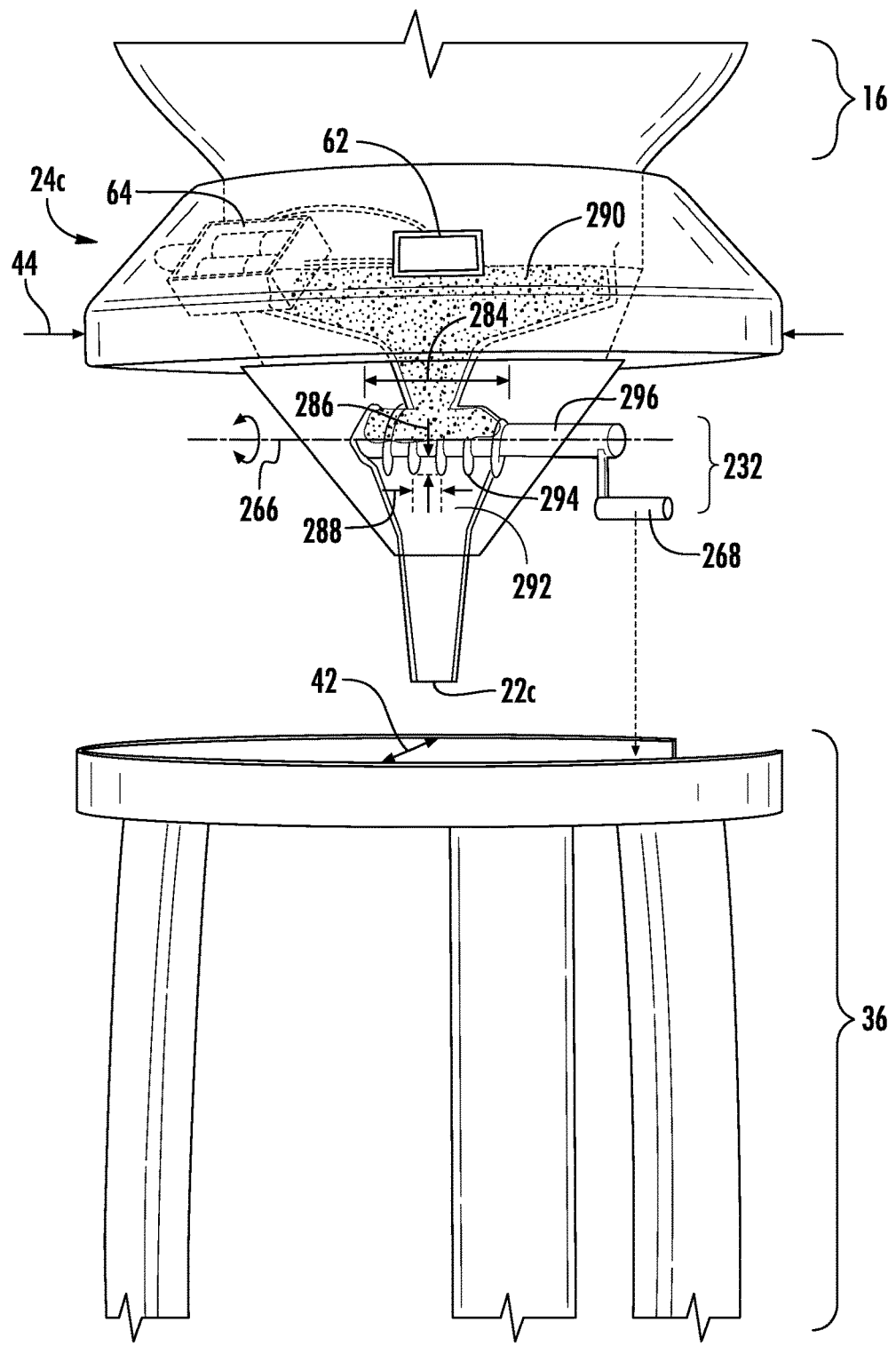
FIG. 22 illustrates mounting of the metering device with the nutrient container to the stand of the dispenser.

In the third embodiment of the metering device 24c, the internal space of the metering device 24c is separated into upper and lower cavities 290, 292, as shown in FIG. 22. The powdered nutrient disposed in the nutrient container 16 flows into the upper cavity 290 first and is stopped by an auger 232. The auger 232 has a handle 268 and a twist 294 formed about shank 296. The twist 294 and shank 296 are rotatable by turning handle 268 about axis 266. The auger 232 is rotated and such rotation urges the powdered nutrient in the upper cavity 290 to flow into the lower cavity 292 in a continuous flow. The handle 268 is rotated until the powdered nutrient 12 has filled the water container 14 to the desired level by the user. Additionally, the auger 232 in terms of its twist 294 and shank 296 may meter out a pre-determined volume of powdered nutrient per revolution of handle 268 about axis 266. After rotating the auger 232, the user may activate vibration unit 62, 64 to ensure that any powdered nutrient 12 that is stuck in the lower cavity 292 is urged out of the distal tip 22c of the metering device 24c into the water bottle.

Figure 20:
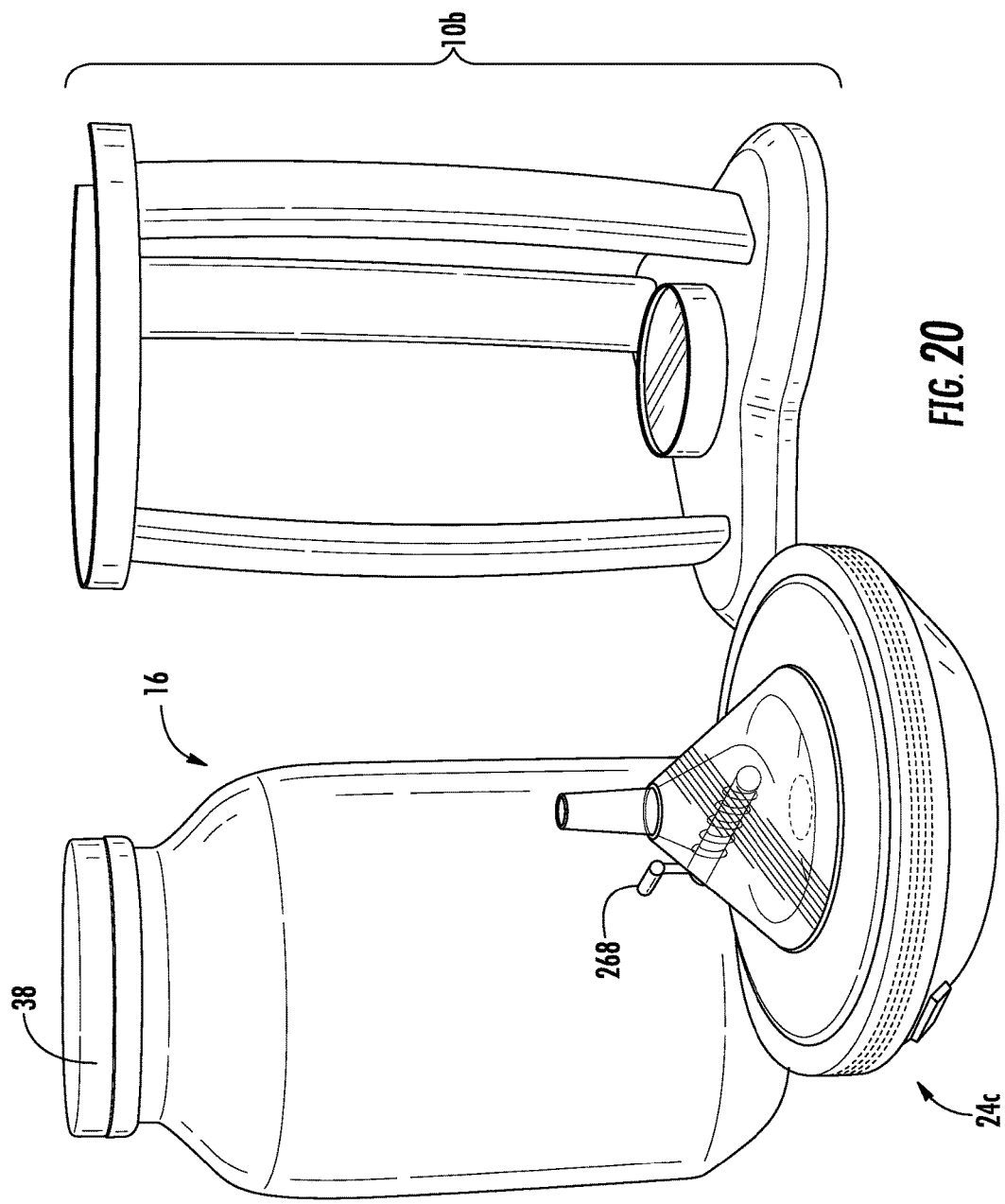
FIG. 20 illustrates the dispenser for powdered nutrient showing a third embodiment of the metering device and the nutrient container containing the powdered nutrient.
Figure 21:
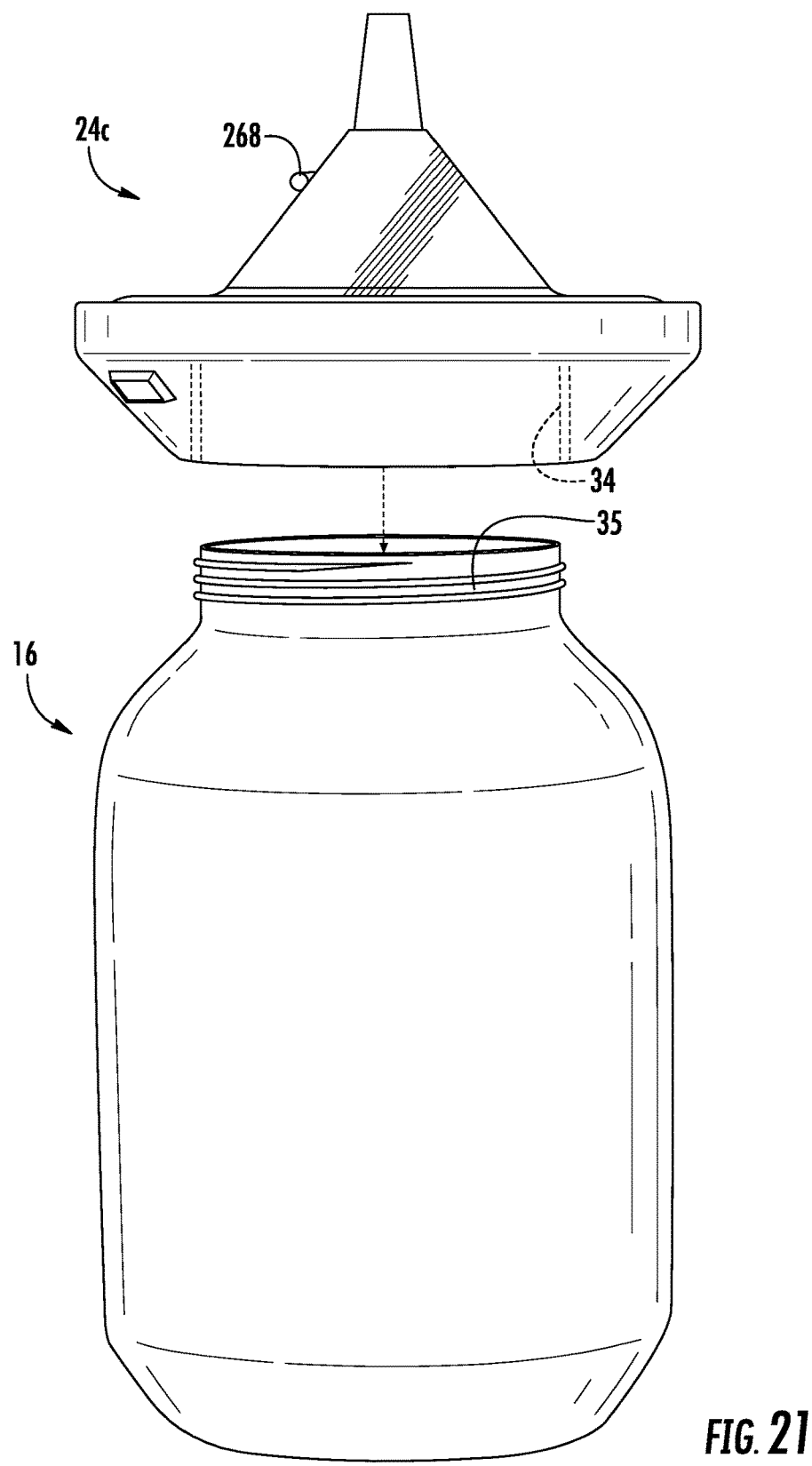
FIG. 21 illustrates attachment of the metering device shown in FIG. 20 with the nutrient container.

Referring now to FIGS. 20 and 21, the metering device 24c may be attached to the nutrient container 16 through a threaded attachment. In particular, a lid 30a is removed from the nutrient container 16 which exposes threads 35 which mates with threads 34 of the metering device 24c. Once the metering device 24c is attached to the nutrient container 16 as shown in FIG. 22, the assembly 24c, 16 is oriented upside down and inserted into stand 36. The stand 36 has an inner diameter 42 that receives outer diameter 44 of the metering device 22c. Preferably, the upper periphery of the stand 36 has an L-shaped ledge that receives and supports the assembly 24c, 16 therein. Once the assembly 24c, 16 is disposed on the stand 36, the distal tip 22c is aligned centrally above the support surface 18 of the stand 36. The distance 270 between the distal tip 22c of the metering device 24c and the support surface 18 is less than a length 72 of the water container 14. In this manner, the distal tip 22c is inserted into the mouth 20 of the water container 14 when the water container 14 is disposed on the support surface 18 as shown in FIG. 24. The water bottle 24 may be disposed on the support surface 18 with the distal tip 22c inserted into the mouth of the water bottle 14 by pressing down on the spring-loaded support surface 18, pivoting the mouth 20 under the distal tip 22c and releasing the water bottle 14. At this time, the spring 56 pushes the water bottle 14 upward so that the distal tip 22c of the metering device 24c is inserted into the mouth 20 of the water container 14.

Referring now to FIG. 25, the handle 268 may be rotated about axis 266. In doing so, the twist 294 is also rotated. By rotating the twist 294, the powdered nutrient 12 is urged around the shaft 296 and into the lower cavity 292 where gravity will force the powdered nutrient 12 out of the distal tip 22c and into the water container 14. The upper and lower cavities 290, 292 may be sized and configured in order to mate with the outer diameter of the twist 292 so that any powdered nutrient 12 that is transferred from the upper cavity 290 to the lower cavity 292 must pass between the twist and not around and outside of the twist 292. The twist 292 may have a distance 288 between the twist 292 that does not allow the powdered nutrient 12 to simply flow downward from the upper cavity 290 to the lower cavity 292 if the auger 232 is not being rotated. A depth of the twist 286 and the length 284 may be sized and configured so that each revolution of the handle 268 dispenses a predetermined amount of powdered nutrient 12 from the upper cavity 290 to the lower cavity 292. By way of example and not limitation, one revolution of the handle 268 may dispense one serving of the powdered nutrient 12 into the lower cavity 292.

The handle is rotated 268 until the desired amount of powdered nutrient 12 is transferred into the water container 14. However, when the handle 268 is not rotated, a small volume of powdered nutrient 12 may be stuck at a distal portion of the metering device 24c, as shown in FIG. 26. In this regard, the user may press a button 62 in order to actuate the vibration device 64 that frees up the powdered nutrient 12 and allows gravity to force the powdered nutrient 12 to flow into the water container 14.

The metering device 24c may operate so that each revolution or predetermined angular rotation of the handle 268 may dispense a pre-determined quantity of powdered nutrient. Alternatively, the metering device 24c may be operated so that the user continues to rotate the handle 268 until the powdered nutrient 12 fills the water bottle to the desired amount. Once the desired amount or proper amount of powdered nutrient 12 is disposed in the water container 14, the user stops rotating the handle 268 and presses the vibration button 62 to eliminate any powdered nutrient 12 from the metering device 24c before the removal of the water container 14. The user then turns off the vibration device 62 by depressing the vibration button 62 again. The water container 14 is pressed downward to traverse the support surface 18 down so that the water container 14 can be removed from the stand 36. The user puts a cap back on the water container 14, shakes the water container 14 and drinks the fluid.

The above description is given by way of example, and not limitation. Given the above disclosure, one skilled in the art could devise variations that are within the scope and spirit of the invention disclosed herein, including various ways of configuring the stand. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A dispenser system for dispensing a predetermined volume of a powdered nutrient, the dispenser system comprising:
    a first container for holding two or more servings of the powdered nutrient, the container having an opening;
    a metering unit for measuring the predetermined volume of the powdered nutrient and dispensing the measured powdered nutrient from a dispensing tip of the metering unit the first container being removably connected to the metering unit so that a second container filled with the powdered nutrient can subsequently be attached to the metering unit;
    a bottle for receiving the measured powdered nutrient dispensed from the dispensing tip, the bottle defining a mouth which is larger than the dispensing tip so that the mouth of the bottle does not contact the dispensing tip when the dispensing tip is inserted into the mouth of the bottle; and
    a stand for receiving the metering unit above a first surface, the stand including a support surface that is traversable between a biased up position and a down position, the down position allowing the mouth of the bottle to slip under the dispensing tip while the bottle pushes down on the support surface and the biased up position wherein the bottle is positioned on the support surface with the dispensing tip at least partially inserted into the mouth of the bottle, and the mouth of the bottle and the dispensing tip having a gap circumscribing the dispensing tip so that fluid communication between an interior of the bottle and an external environment is maintained when the dispensing tip is at least partially inserted into the mouth of the bottle;
    wherein a height of the bottle is greater than a first distance defined between an end of the dispensing tip the support surface when the support surface is in the biased up position and less than a second distance defined between the end of the dispensing tip and the support surface when the support surface is in the down position.

2. The dispenser system of claim 1 wherein the metering unit defines a measuring cup that is a chamber with a cavity with a volume equal to the predetermined volume of powdered nutrient.

3. The dispenser system of claim 2 wherein the measuring cup is rotatable at least 180° so that the measuring cup is fillable with the powdered nutrient then rotated 180° to empty the powdered nutrient in the measuring cup into the bottle.

4. The dispenser system of claim 1 wherein the metering unit has a guillotine traversable between an opened position and a closed position, the powdered nutrient filling a cavity of the metering unit when the guillotine is traversed to the opened position and preventing a flow of the powdered nutrient to the cavity when the guillotine is traversed to the closed position.

5. The dispenser system of claim 4 wherein the guillotine is biased to the closed position.

6. The dispenser system of claim 1 wherein the metering unit has a rotatable auger for flowing the powdered nutrient from an upper cavity to a lower cavity.

7. The dispenser system of claim 1 further comprising a vibration unit for facilitating removal of the powdered nutrient from the metering unit into the bottle, the vibration unit being attached to the metering unit.

8. The dispenser system of claim 1 wherein a first part of a fastening system is a screw thread and a second part of the fastening system is a mating screw thread.

9. The dispenser system of claim 1 wherein the stand includes a spring underneath the support surface arranged to bias the support surface in the biased up position.

10. A method of dispensing a predetermined volume of a powdered nutrient from a first container to a bottle comprising:
    measuring the predetermined volume of the powdered nutrient in a metering unit to which the container is removably attached;
    receiving the bottle on a support surface of a stand that holds the metering unit such that the bottle is underneath a dispensing tip of the metering unit and the support surface is at a down position;
    releasing the support surface such that the support surface traverses to a biased up position in which the bottle is raised above the down position to a predetermined level, the dispensing tip is at least partially inserted into a mouth of the bottle and the mouth of the bottle and the dispensing tip having a gap circumscribing the dispensing tip so that fluid communication between an interior of the bottle and an exterior environment is maintained when the dispensing tip is at least partially inserted into the mouth of the bottle; and
    dispensing the measured powdered nutrient from the dispensing tip into the bottle.

11. The method of claim 10 wherein the dispensing includes rotating a measuring cup of the metering unit at least 180° to empty the measured powdered nutrient from the measuring cup into the bottle.

12. The method of claim 10 wherein the measuring includes moving a guillotine from a closed position, at which flow of the powdered nutrient from the container to a cavity of the metering unit is prevented, to an opened position to fill the cavity with the powdered nutrient.

13. The method of claim 12 wherein the guillotine is biased to the closed position.

14. The method of claim 10 wherein the dispensing includes rotating an auger such that the powdered nutrient flows from an upper cavity of the metering unit to a lower cavity of the metering unit.

15. The method of claim 10 wherein the dispensing includes vibrating the metering unit to facilitate removal of the measured powdered nutrient from the metering unit into the bottle.

16. A dispenser for dispensing a predetermined volume of a powdered nutrient, the dispenser comprising:
    a first container for holding two or more servings of the powdered nutrient, the container having an opening;
    a metering unit defining a measuring cup for measuring the predetermined volume of the powdered nutrient and dispensing the measured powdered nutrient from a dispensing tip of the metering unit, the first container being removably connected to the metering unit so that a second container filled with the powdered nutrient can subsequently be attached to the metering unit;

a stand for receiving the metering unit above a surface, the stand including a support surface that is traversable between a biased up position and a down position, the down position allowing for a mouth of a water bottle to slip under the dispensing, tip while the water bottle pushes down on the support surface and the biased up position wherein the water bottle is positioned on the support surface with the dispensing tip at least partially inserted into the water bottle, and the mouth of the water bottle and the dispensing tip having a gap circumscribing the dispensing tip so that fluid communication between an interior of the water bottle and an external environment is maintained when the dispensing tip is at least partially inserted into the water bottle.

17. The dispenser of claim 16 wherein the measuring cup is a chamber with a cavity with a volume equal to the predetermined volume of the powdered nutrient, the measuring cup being rotatable at least 180° so that the measuring cup is fillable with the powdered nutrient then rotated 180° to empty the powdered nutrient in the measuring cup into a water bottle.

18. The dispenser of claim 16 wherein the metering unit has a guillotine traversable between an opened position and a biased closed position, the powdered nutrient filling the measuring cup when the guillotine is traversed to the opened position and preventing a flow of the powdered nutrient to the measuring cup when the guillotine is traversed to the closed position.

19. The dispenser of claim 16 further comprising a vibration unit for facilitating removal of the powdered nutrient from the measuring cup into the water bottle, the vibration unit being attached to the metering unit.

20. The dispenser system of claim 16 wherein the stand includes a spring underneath the support surface arranged to bias the support surface in the biased up position.

* * * * *